United States Patent
Sota et al.

(10) Patent No.: US 7,386,180 B2
(45) Date of Patent: Jun. 10, 2008

(54) IMAGE SIGNAL REPRODUCTION APPARATUS AND IMAGE SIGNAL REPRODUCTION METHOD

(75) Inventors: Akira Sota, Osaka (JP); Katsumi Hoashi, Neyagawa (JP); Ryoji Yamaguchi, Yawata (JP)

(73) Assignee: Matsushita Electric Industrial Co., Ltd., Osaka, NJ (US)

( * ) Notice: Subject to any disclaimer, the term of this patent is extended or adjusted under 35 U.S.C. 154(b) by 1064 days.

(21) Appl. No.: 10/770,562

(22) Filed: Feb. 4, 2004

(65) Prior Publication Data

US 2004/0179611 A1 Sep. 16, 2004

(30) Foreign Application Priority Data

Feb. 5, 2003 (JP) ............... 2003-028424

(51) Int. Cl.
*G06K 9/36* (2006.01)
(52) U.S. Cl. .................................. 382/233
(58) Field of Classification Search ........ 382/232–233, 382/236, 238, 248–251; 348/384.1, 390.1, 348/394.1, 395.1, 419.1, 480.1, 715, 716; 375/240, 240.1, 240.13, 240.26; 386/33, 386/52, 68; 708/203; 709/233
See application file for complete search history.

(56) References Cited

U.S. PATENT DOCUMENTS 5,798,719 A * 8/1998 Wise et al. ............... 341/67
5,801,973 A * 9/1998 Wise et al. ............... 708/203
6,658,056 B1 * 12/2003 Duruoz et al. ............ 375/240
6,891,894 B1 * 5/2005 Kim et al. ............. 375/240.26
7,292,772 B2 * 11/2007 Ueda ............................ 386/52
2002/0081095 A1 6/2002 Van Den Enden

FOREIGN PATENT DOCUMENTS

JP 2000-165818 6/2000

* cited by examiner

*Primary Examiner*—Jose L. Couso
(74) *Attorney, Agent, or Firm*—Wenderoth, Lind & Ponack, L.L.P.

(57) ABSTRACT

An image signal reproduction apparatus and an image signal reproduction method that can reproduce video signals at high speed with stability. A skip decoding field counter is set on the basis of a factor by which the reproduction speed is multiplied and the number of fields included in one frame image. When decoding of coded data corresponding to one frame to be decoded is completed, it is judged whether the skip decoding field counter is larger than zero or not. When the counter is larger than zero, the number of fields corresponding to a picture to be skipped is subtracted from the counter, and when the picture to be skipped is I or P coded data, the decoding is instructed, while when the picture is B coded data, the skipping is instructed. These processes are repeated until the counter becomes 0 or smaller.

16 Claims, 14 Drawing Sheets

Schematic representation

IMAGE SIGNAL REPRODUCTION APPARATUS AND IMAGE SIGNAL REPRODUCTION METHOD

FIELD OF THE INVENTION

The present invention relates to an image signal reproduction apparatus and an image signal reproduction method for decoding a coded image signal that has been compressed for example by MPEG (Moving Picture Experts Group) method to display a picture and, more particularly, to an image signal reproduction apparatus and an image signal reproduction method that achieve an image reproduction speed higher than 1-fold speed.

BACKGROUND OF THE INVENTION

Initially, a typical MPEG image transmission method will be described. By the MPEG method, picture information is transmitted using three types of MPEG image signals comprising I coded data, P coded data, and B coded data. Here, I coded data is an image signal that is coded within one frame and completed within one picture. Image data that is obtained by decoding I coded data is referred to as I picture.

P coded data is an image signal that is obtained by coding a difference with respect to a reference picture that was previously coded to generate I coded data or P coded data. Difference data obtained by decoding P coded data is added to the reference picture, and image data that is obtained by decoding the resultant data is referred to as P picture.

Further, B coded data is an image signal that is obtained by coding differences with respect to two reference pictures that were coded to generate the immediately preceding and immediately following I or P coded data. Difference data that is obtained by decoding B coded data and the reference pictures are added, thereby reproducing image data. This reproduced image data is ref erred to as B picture.

In the MPEG method, the interval between I picture and P picture is not defined. Accordingly, as shown In FIG. 12, it is possible to generate a coded video stream including various intervals between I picture and P picture or intervals between P pictures.

In a coded video stream that is coded by the MPEG method, when I coded data or P coded data is to be decoded, the immediately preceding I or P picture is displayed, while when B coded data is decoded, B picture Is displayed while being decoded.

At the display of I or P picture, decoding of I or P coded data is performed so as to display a picture that was already decoded and stored in an output buffer.

At the display of B picture, decoding of B coded data is performed so as to display B picture that will be decoded.

FIG. 9 illustrates a structure of a conventional image signal reproduction apparatus. The image signal reproduction apparatus as shown in FIG. 9 decodes a coded video stream. A video decoding circuit 9001 decodes an inputted coded video stream 9101.

The decoding is performed in accordance with a decode control signal 9112 that is inputted from a video display control circuit 9007 to the video decoding circuit 9001. Decoded data 9102, 9103, and 9104 are inputted to a first output buffer 9002, a second output buffer 9003, and a third output buffer 9004, respectively. The video decoding circuit 9001 extracts a stream control signal 9111 from the coded video stream 9101 and outputs the extracted signal to the video display control circuit 9007.

The first output buffer 9002 stores the decoded data 9102 outputted from the video decoding circuit 9001, and outputs decoded data 9105 to the video decoding circuit 9001 or a video output circuit 9005. The decoded data 9102 stored in the first output buffer 9002 are I pictures or P pictures.

Similarly, the second output buffer 9003 stores the decoded data 9103 from the video decoding circuit 9001, and outputs decoded data 9106 to the video decoding circuit 9001 or the video output circuit 9005. The decoded data 9103 stored in the second output buffer 9003 are also I pictures or P pictures.

The third output buffer 9004 stores the decoded data 9104 from the video decoding circuit 9001 and outputs decoded data 9107 to the video decoding circuit 9001 or the video output circuit 9005, while the decoded data 9104 stored in the third output buffer 9004 are only B pictures.

In FIG. 9, a sync signal generation circuit 9006 outputs a NTSC sync signal or PAL sync signal 9109. The video display control circuit 9007 outputs the decode control signal 9112 to the video decoding circuit 9001 in accordance with the stream control signal 9111 received from the video decoding circuit 9001 and the sync signal 9109 received from the sync signal generation circuit 9006, and outputs a display control signal 9110 to the video output circuit 9005.

The video output circuit 9005 repeatedly performs an operation of selecting one of the decoded data 9105, 9106, and 9107 from the first output buffer 9002, the second output buffer 9003, and the third output buffer 9004, in accordance with the display control signal 9110 received from the video display control circuit 9007, and outputting the selected data as a video output signal 9108.

FIG. 10 is a flowchart for explaining the control by the video display control circuit 9007. Hereinafter, the data processing procedure by the conventional image signal reproduction apparatus will be described with reference to FIG. 9 and the control flowchart of FIG. 10.

As shown in FIG. 10, in step S10002, the video display control circuit 9007 judges whether a decode starting position of coded data is reached or not on the basis of the stream control signal 9111 from the video decoding circuit 9001, and stands by up to the decode starting position. When the decode starting position is reached, the video display control circuit 9007 performs display setting (step S10003), and then instructs the video decoding circuit 9001 of decoding of coded data (step S10004).

Then, in step S10005, the video display control circuit 9007 judges whether decoding of coded data corresponding to one frame has been completed or not. When the decoding is completed, the circuit 9007 further judges whether all coded data have been decoded or not (step S10006). When decoding of all coded data is not completed, the operation returns to step S10002, while the decoding of all coded data is completed, the control is finished.

FIG. 11(a) shows an input pattern of a coded video stream. FIG. 11(b) shows decoded data stored in the first output buffer 9002, the second output buffer 9003 and the third output buffer 9004, and the video output signal 9108, in the case where the coded video stream has the input pattern as shown in FIG. 11(a).

In FIG. 11, for example, P8 coded data is decoded and stored in the second output buffer 9003 prior to B6 and B7 coded data, and B6 and B7 coded data are thereafter decoded and stored in the third output buffer 9004. In the video output signal 9108, however, B6 and B7 pictures are located forward of P8 picture.

High-speed reproduction for arbitrary coded video streams, which is confined to double-speed reproduction is implemented in Japanese Published Patent Application No. 2000-165818.

This conventional image signal reproduction can achieve high-speed reproduction by controlling the reproduction speed of images. However, at the high-speed reproduction, only I and P coded data are decoded while all B coded data are skipped. Therefore, when the coded data are arranged according to the input pattern of the coded video stream as shown in FIG. 12, the interval between I picture and P picture and the interval between P pictures in the decoded video output are not uniform. More specifically, the intervals are four pictures, two pictures, three pictures, one picture, and three pictures as shown in FIG. 12, whereby the reproduction speed is not constant.

Further, in the case of a coded video stream that does not include B pictures, no picture is skipped, whereby high-speed reproduction cannot be realized.

SUMMARY OF THE INVENTION

The present invention has for its object to provide an image signal reproduction apparatus and an image signal reproduction method that can realize high-speed reproduction with stability.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an image signal reproduction apparatus including: a video decoding unit for decoding a coded video stream; an output buffer for storing data decoded by the video decoding unit; a video output unit for converting the decoded data that is stored in the output buffer into a final video output signal; a decoding count unit for counting the number of skip decoding fields, the decoding in the video decoding unit of the fields being skipped; a multi-stage decoding control unit for controlling the decoding or skipping thereof in the video decoding unit; a video display control unit for controlling the control for the video decoding unit by the multistage decoding control unit and the conversion of the decoded data into the final video output signal by the video output unit; and a sync signal generation unit for supplying a video sync signal to the video output unit and the video display control unit, and in this image signal reproduction apparatus; the decoding count unit sets the number of skip decoding fields on the basis of a multiple reproduction speed for the coded video stream and the number of fields included in one frame image to be decoded, and counts down the set number of skip decoding fields each time a new frame is inputted the video decoding unit skips decoding of the coded stream of a pictures that is not referred to, after the coded video stream corresponding to one frame has been decoded until the decoding count unit counts down the set number of skip decoding fields up to zero, and when decoded data corresponding to the frame is not referred to at prediction, the video output unit outputs the decoded data corresponding to the frame in synchronization with the video sync signal, while when the decoded data corresponding to the frame is referred to at prediction, the video output unit outputs decoded data that has been decoded immediately before the decoded data corresponding to the frame and is referred to at prediction, in synchronization with the video sync signal. Therefore, when decoding a coded video stream to reproduce images, by skipping a coded video stream corresponding to a predetermined number of fields each time an image of one frame is outputted, it is possible to easily achieve high-speed reproduction with an image reproduction speed multiplied by an arbitrary integer.

According to a 2nd aspect of the present invention, in the image signal reproduction apparatus of the 1st aspect, the output buffer stores decoded data corresponding to three frames, and the video decoding unit achieves K-fold speed reproduction by executing a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to two frames, while skipping a coded stream of a picture that is not displayed nor referred to, repeatedly by (K−1) times (K is an integer that meets K≧1), Therefore, it is possible to easily achieve high-speed reproduction with an image reproduction speed multiplied by an arbitrary integer. In addition, even when coded data that are referred to by the following coded data are to be skipped at the high-speed image reproduction, the skip decoding can be easily performed by the output buffer of a size corresponding to three frames. Since the output buffer for decoded data can be realized by a size corresponding to three frames, it is possible to suppress the usage amount of a memory in a system that requires a large capacity frame buffer, such as a HDTV.

According to a 3rd aspect of the present invention, there is provided an image signal reproduction apparatus including: a video decoding unit for decoding a coded video stream; an output buffer that store data decoded by the video decoding unit; a video output unit for converting the decoded data stored in the output buffer into a final video output signal; a decoding count unit for counting the number of skip decoding fields, the decoding in the video decoding unit of the fields being skipped; a multi-stage decoding control unit for controlling the decoding or skipping thereof in the video decoding unit; a display count unit for counting the number of display fields that are used to display an image in the video output unit; a video display control unit for controlling the control for the video decoding unit by the multistage decoding control unit and the conversion of the decoded data into the final video output signal by the video output unit; and a sync signal generation unit for supplying a video sync signal to the video output unit and the video display control unit, and, in the image signal reproduction apparatus, the display count unit sets the number of display fields on the basis of a multiple reproduction speed for the coded video stream and the number of fields included in one frame image to be displayed, and count downs the set number of display fields each time an image is outputted by the video output unit, the decoding count unit changes the number of skip decoding fields according to the number of display fields on the basis of the multiple reproduction speed for the coded video stream and the number of fields included in one frame image to be decoded, and counts down the changed number of skip decoding fields each time a new frame is inputted, the video decoding unit skips decoding of a coded stream of pictures that are not referred to, after the coded video stream corresponding to one frame has been decoded until the decoding count units counts down the changed number of skip decoding fields up to zero, and when decoded data corresponding to the frame is not referred to at prediction, the video output unit outputs the decoded data corresponding to the frame in synchronization with the video sync signal, while when the decoded data corresponding to one frame is referred to at prediction, the video output unit outputs decoded data that has been decoded immediately before the decoded data corresponding to one frame and is referred to at prediction, in synchronization with the video sync signal. Therefore, when decoding a coded video stream to reproduce images, the number of fields corresponding to a picture of coded data which are to be skipped is counted as the number of skip decoding fields, the number of fields corresponding to the final video output signal is counted as the number of display fields, and the number of skip decoding fields corresponding to the coded data is controlled on the basis of the number of display fields. Accordingly, it is possible to easily achieve high-speed reproduction with an image reproduction speed that is one multiplied by an arbitrary integer or an arbitrary non-integer.

According to a 4th aspect of the present invention, in the image signal reproduction apparatus of the 3rd aspect, the output buffer stores decoded data corresponding to three frames, and the video decoding unit executes a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to two frame, while skipping a coded stream of a picture that is not displayed nor referred to, repeatedly by (L−2) times (L is an integer that meets L≧2) to achieve (L−1)-fold speed reproduction, or repeatedly by (L−1) times to achieve L-fold speed reproduction, the (L−1)-fold speed reproduction and the L-fold speed reproduction being properly switched, thereby achieving P-fold speed reproduction (L−1<P<L). Therefore, it is possible to easily achieve high-speed reproduction with an image reproduction speed multiplied by an arbitrary non-integer. In addition, even when coded data that are referred to by the following coded data are to be skipped at the high-speed image reproduction, the skip decoding can be easily performed by the output buffer of a size corresponding to three frames. Since the output buffer for decoded data can be realized by a size corresponding to three frames, it is possible to suppress the usage amount of a memory in a system that requires a large capacity frame buffer, such as HDTV.

According to a 5th aspect of the present invention, In the image signal reproduction apparatus of the 4th aspect, the video display control unit performs control so that the execution of the (L−1)-fold speed reproduction and the execution of the L-fold speed reproduction are carried out at a ratio of p:(1-p) (0<p<1), thereby setting the reproduction speed for the coded video stream at (L−p)-fold speed. Therefore, the reproduction speed for the coded video stream can be easily set at (L−p)-fold speed.

According to a 6th aspect of the present invention, in the image signal reproduction apparatus of the 4th aspect, the display count unit obtains an interval for switching the (L−1)-fold speed reproduction and the L-fold speed reproduction by a digital differential analyzer method using a combination of integers a and b having a relationship of 1<a/b<2, and the video display control unit sets the reproduction speed for the coded video stream at (L−2+a/b)-fold speed. Therefore, it is possible to control the image reproduction speed using the digital differential analyzer method, whereby the reproduction speed for image signals can be kept constant.

According to a 7th aspect of the present invention, in the image signal reproduction apparatus of the 5th aspect, the video display control sets the reproduction speed for the coded video stream at (1200/1001)-fold speed, and the sync signal generation unit outputs a PAL sync signal, thereby converting a frame rate of the coded video stream from a NTSC frame rate to a PAL frame rate. Therefore, the frame rate can be easily converted from the NTSC frame rate to the PAL frame rate.

According to an 8th aspect of the present invention, in the image signal reproduction apparatus of the 5th aspect, the video display control unit sets the reproduction speed for the coded video stream at (1200/1001)-fold speed, and the sync signal generation unit outputs a PAL sync signal, thereby converting a frame rate of the coded video stream from a NTSC frame rate to a PAL frame rate. Therefore, the frame rate can be easily converted from the NTSC frame rate to the PAL frame rate.

According to a 9th aspect of the present invention, there is provided an image signal reproduction method for decoding a coded video stream in synchronization with a video sync signal, converting decoded data into a final video signal, and outputting the final video signal in synchronization with the video sync signal, comprising the steps of: setting the number of skip decoding fields, the decoding of the fields being skipped, on the basis of a multiple reproduction speed for the coded video stream and the number of fields included in one frame image to be decoded; after decoding the coded video stream corresponding to one frame, skipping the decoding of a coded stream of pictures that are not referred to, while each time a new frame is inputted, counting down the set number of skip decoding fields up to zero; storing the decoded data into an output buffer; with start of the decoding of one frame, when decoded data corresponding to the frame is not referred to at prediction, converting the decoded data corresponding to the frame into the final video output signal and outputting the final video signal in synchronization with the video sync signal, while when the decoded data corresponding to the frame is referred to at the prediction, converting decoded data that has been decoded immediately before the decoded data corresponding to the frame and is referred to at the prediction into the final video output signal and outputting the final video output signal in synchronization with the video sync signal. Therefore, when decoding a coded video stream to reproduce images, by skipping a coded video stream corresponding to a predetermined number of fields each time an image of one frame is outputted, it is possible to easily achieve high-speed reproduction with an image reproduction speed multiplied by an arbitrary integer.

According to a 10th aspect of the present invention, in the image signal reproduction method of the 9th aspect, decoded data corresponding to three frames are stored in the output buffer, and in the step of skipping decoding of the coded video stream, a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to the two frames, while skipping a coded stream of a picture that is not displayed nor referred to, is executed repeatedly by (K−1)

times (K is an integer that meets K≧1), thereby achieving K-fold speed reproduction. Therefore, it is possible to easily achieve high-speed reproduction with an image reproduction speed multiplied by an arbitrary integer. In addition, even when coded data that are referred to by the following coded data are to be skipped at the high-speed image reproduction the skip decoding can be easily performed by the output buffer of a size corresponding to three frames. Since the output buffer for decoded data can be realized by a size corresponding to three frames, it is possible to suppress the usage amount of a memory in a system that requires a large capacity frame buffer, such as a HDTV.

According to an 11th aspect of the present invention, there is provided an image signal reproduction method for decoding a coded video stream in synchronization with a video sync signal, converting decoded data into a final video signal and outputting the final video signal in synchronization with the video sync signal, comprising the steps of: setting the number of display fields that are used for an image to be displayed, on the basis of a multiple reproduction speed for the coded video stream and the number of fields included in one frame image to be displayed; changing the number of skip decoding fields, the decoding of the coded video stream corresponding to the fields being skipped according to the set number of display fields, on the basis of the multiple reproduction speed for the coded video stream and the number of fields included in one frame image to be decoded; after decoding the coded video stream corresponding to one frame, skipping the decoding of the coded video stream of pictures that are not referred to, while each time a new frame is inputted, counting down the changed number of skip decoding fields up to zero; storing the decoded data into an output buffer; and when decoded data corresponding to the frame is not referred to at prediction, converting the decoded data corresponding to the frame into a final video output signal and outputting the final video output signal in synchronization with the video sync signal, while when the decoded data corresponding to the frame is referred to at the prediction, converting decoded data that has been decoded immediately before the decoded data corresponding to the frame and is referred to at the prediction into a final video output signal and outputting the final video output signal in synchronization with the video sync signal. Therefore, when decoding a coded video stream to reproduce images, the number of fields corresponding to a picture of coded data which are to be skipped is counted as the number of skip decoding fields, the number of fields corresponding to the final video output signal is counted as the number of display fields, and the number of skip decoding fields corresponding to coded data is controlled on the basis of the number of display fields. Accordingly, it is possible to easily achieve high-speed reproduction with an image reproduction speed that is one multiplied by an arbitrary integer or an arbitrary non-integer.

According to a 12th aspect of the present invention, in the image signal reproduction method of the 11th aspect, decoded data corresponding to three frames are stored in the output buffer, and in the step of skipping decoding of the coded video stream, a process of performing the decoding of the coded video stream corresponding to one frame once using the output buffer corresponding to one frame, and decoding a coded video stream of pictures that are not displayed but are referred to, using the remaining output buffer corresponding to two frames, thereby successively writing the decoded data over the output buffer corresponding to the two frames, while skipping a coded video stream of a pictures that is not displayed nor referred to is executed repeatedly by (L−2) times (L is an integer that meets L>2) to achieve (L−1)-fold speed reproduction, or repeatedly by (L−1) times to achieve L-fold speed reproduction, the (L−1)-fold speed reproduction and the L-fold speed reproduction being properly switched, thereby achieving P-fold speed reproduction (L−1<P<L). Therefore, it is possible to easily achieve high-speed reproduction with an image reproduction speed multiplied by an arbitrary non-integer. In addition, even when coded data that are referred to by the following coded data are to be skipped at the high-speed image reproduction, the skip decoding can be easily performed by the output buffer of a size corresponding to three frames. Since the output buffer for decoded data can be realized by a size corresponding to three frames, it is possible to suppress the usage amount of a memory in a system that requires a large capacity frame buffer, such as HDTV.

According to a 13th aspect of the present invention, in the image signal reproduction method of the 12th aspect, in the step of changing the number of skip decoding fields, the execution of the (L−1)-fold speed reproduction and the execution of the L-fold speed reproduction are controlled so as to be carried out at a ratio of p:(1-p) (0<p<1), thereby setting the reproduction speed for the coded video stream at (L-p)-fold speed. Therefore, the reproduction speed for the coded video stream can be easily set at (L-p)-fold speed.

According to a 14th aspect of the present invention, in the image signal reproduction method of the 12th aspect, in the step of changing the number of skip decoding fields, an interval for switching the (L−1)-fold speed reproduction and the L-fold speed reproduction is obtained by a digital differential analyzer method using a combination of integers a and b having a relationship of 1<a/b<2, and the reproduction speed for the coded video stream is get at (L−2+a/b)-fold speed Therefore, it is possible to control the image reproduction speed using the digital differential analyzer method, whereby the reproduction speed for image signals can be kept constant.

According to a 15th aspect of the present invention, in the image signal reproduction method of the 13th aspect, in the step of changing the number of skip decoding fields, the reproduction speed for the coded video stream is set at (1200/1001)-fold speed, and a PAL sync signal is employed as the video sync signal, thereby converting a frame rate of the coded video stream from a NTSC frame rate to a PAL frame rate. Therefore, the frame rate can be easily converted from the NTSC frame rate to the PAL frame rate.

According to a 16th aspect of the present invention, in the image signal reproduction method of the 13th aspect, in the step of changing the number of skip decoding fields, the reproduction speed for the coded video stream is set at (1200/1001)-fold speed, and a PAL sync signal is employed as the video sync signal, thereby converting a frame rate of the coded video stream from a NTSC frame rate to a PAL frame rate. Therefore, the frame rate can be easily converted from the NTSC frame rate to the PAL frame rate.

DETAILED DESCRIPTION OF THE PREFERRED EMBODIMENTS

Figure 1:
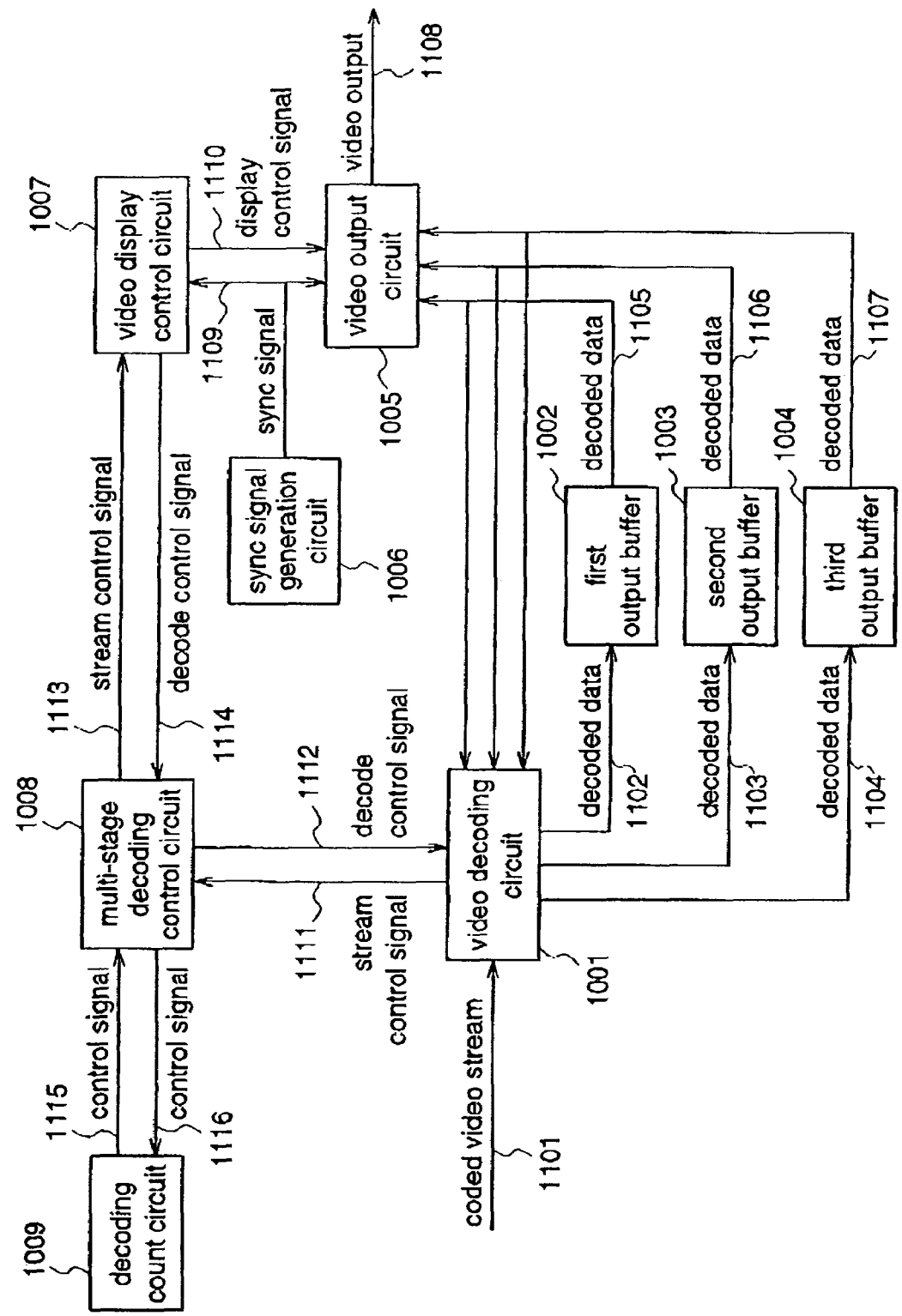
FIG. 1 is a block diagram schematically illustrating an entire construction of an image signal reproduction apparatus according to a first embodiment of the present invention.

Hereinafter, embodiments of the present invention will be described with reference to the drawing.

Embodiment 1

FIG. 1 is a block diagram illustrating an entire construction of an image signal reproduction apparatus according to a first embodiment of the present invention.

As shown in FIG. 1, the image signal reproduction apparatus according to the first embodiment decodes a coded video stream and this apparatus is constituted by a video decoding circuit 1001, a video display control circuit 1007, a video output circuit 1005, a sync signal generation circuit 1006, a multi-stage decoding control circuit 1008, a decoding count circuit 1009, and output buffers 1002 to 1004. This embodiment is characterized by the multi-stage decoding control circuit 1008 and the decoding count circuit 1009.

The sync signal generation circuit 1006 outputs a NTSC or PAL video sync signal 1109. The video decoding circuit 1001 receives a coded video stream 1101, and outputs a stream control signal 1111 that is extracted from the coded video stream 1101 to the multistage decoding control circuit 1008, as well as decodes the coded video stream 1101. The decoding of the stream by the video decoding circuit 1101 is performed in accordance with a decode control signal 1112 that is outputted from the multi-stage control circuit 1008.

The data decoded by the video decoding circuit 1001 are outputted to the first output buffer 1002, the second output buffer 1003, or the third output buffer 1004.

These three output buffers 1002 to 1004 stores the decoded data that are inputted from the video decoding circuit 1001, and outputs the stored decoded data to the video decoding circuit 1001 or the video output circuit 1005.

The video output circuit 1005 converts decoded data 1105, 1106, or 1107 from the first output buffer 1002, the second output buffer 1003, or the third output buffer 1004, respectively, into a final video output signal 1108. This conversion is performed in accordance with a display control signal 1110 that is outputted from the video display control circuit 1007.

The video display control circuit 1007 generates a decode control signal 1114 for the multi-stage control circuit 1008 and the display control signal 1110 for the video output circuit 1005, on the basis of a stream control signal 1113 from the multi-stage decoding control circuit 1008 and the video sync signal 1109 from the sync signal generation circuit 1006, respectively.

The decoding count circuit 1009 generates a control signal 1115 on the basis of a control signal 1116 from the multi-stage decoding control circuit 1008 for skipping a predetermined number of coded data, and outputs the control signal 1115 to the multi-stage decoding control circuit 1008.

The multi-stage decoding control circuit 1008 generates the decode control signal 1112 for the video decoding circuit 1001, the stream control signal 1113 for the video display control circuit 1007, and the control signal 1116 for the decoding count circuit 1009 on the basis of the stream control signal 1111 from the video decoding circuit 1001, the decode control signal 1114 from the video display control circuit 1007, and the control signal 1115 from the decoding count circuit 1009, respectively.

Hereinafter, the operation of the image signal reproduction apparatus according to the first embodiment will be specifically described with reference to a control flowchart in FIG. 2, mainly focusing attention on operations of the video display control circuit 1007, the multistage decoding control circuit 1001, and the decoding count circuit 1009.

Figure 12:
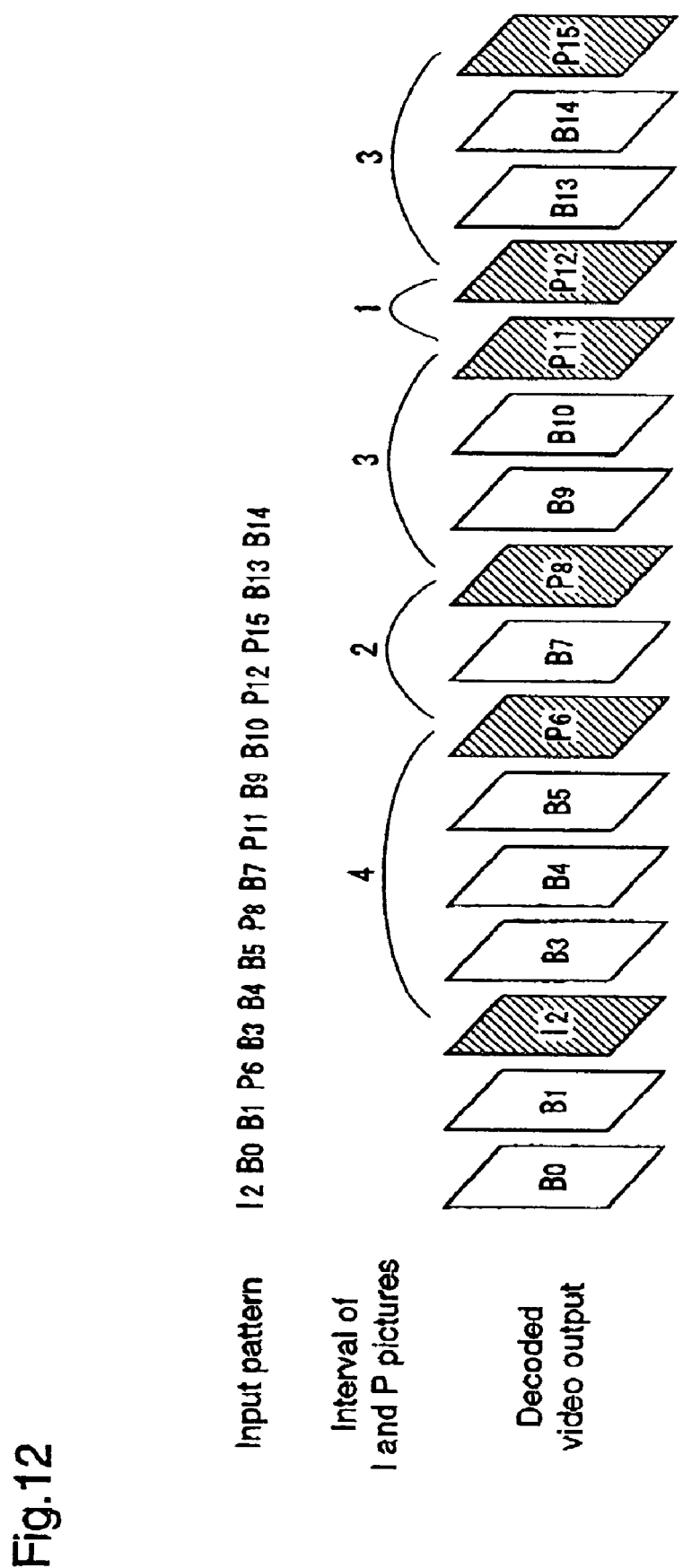
FIG. 12 is a diagram showing an example of a MPEG stream in which the interval between I picture and P picture and the interval between P pictures are not uniform.

In the first embodiment, the operation at 1-fold speed reproduction is omitted and only the operation at high-speed reproduction will be explained taking a case where triple speed reproduction is carried out for the input pattern as shown in FIG. 12.

Figure 2:
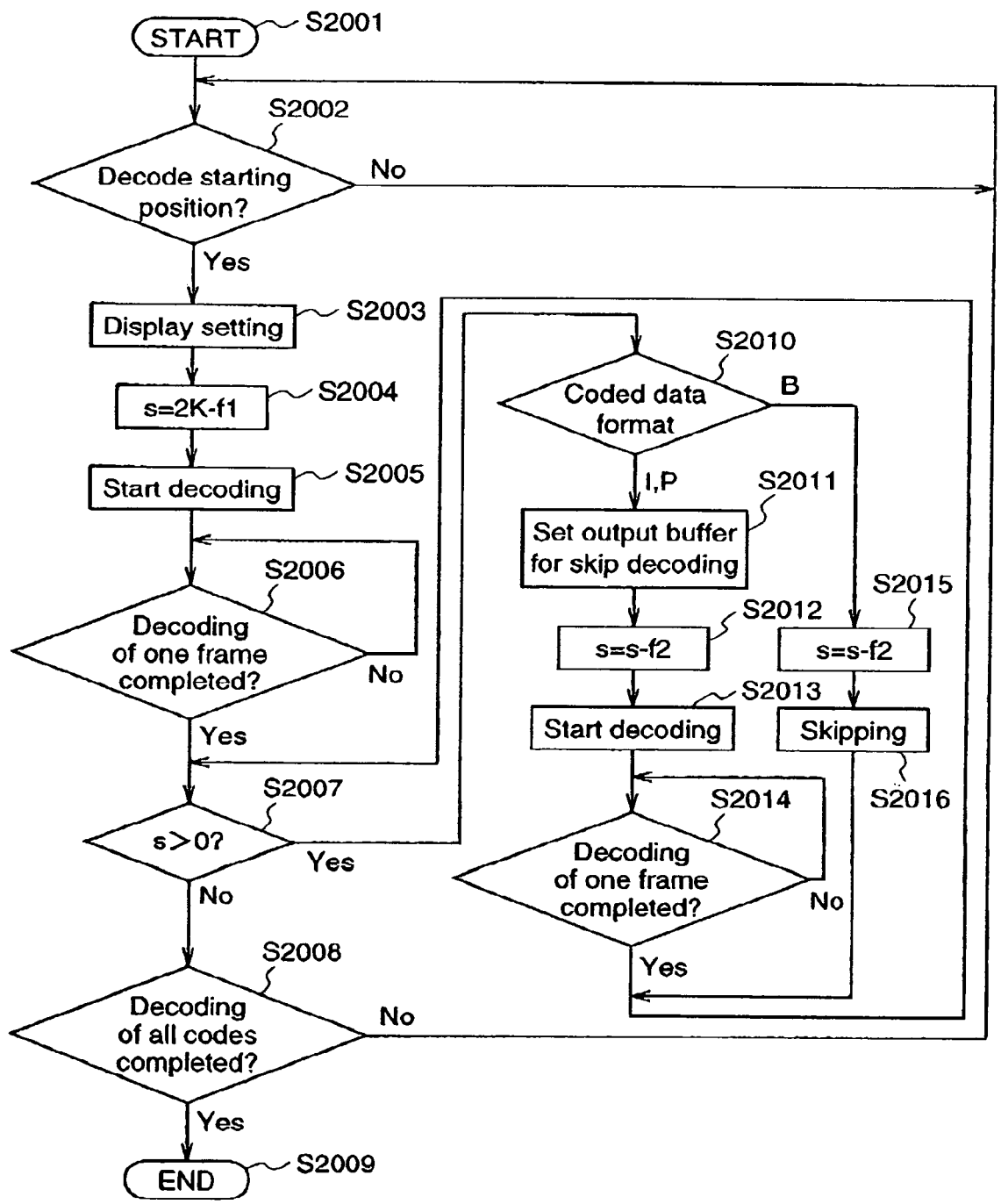
FIG. 2 is a flowchart for explaining a high-speed reproduction operation of the image signal reproduction apparatus shown in FIG. 1, showing control by a video display control circuit and a decoding count circuit
Figure 4:
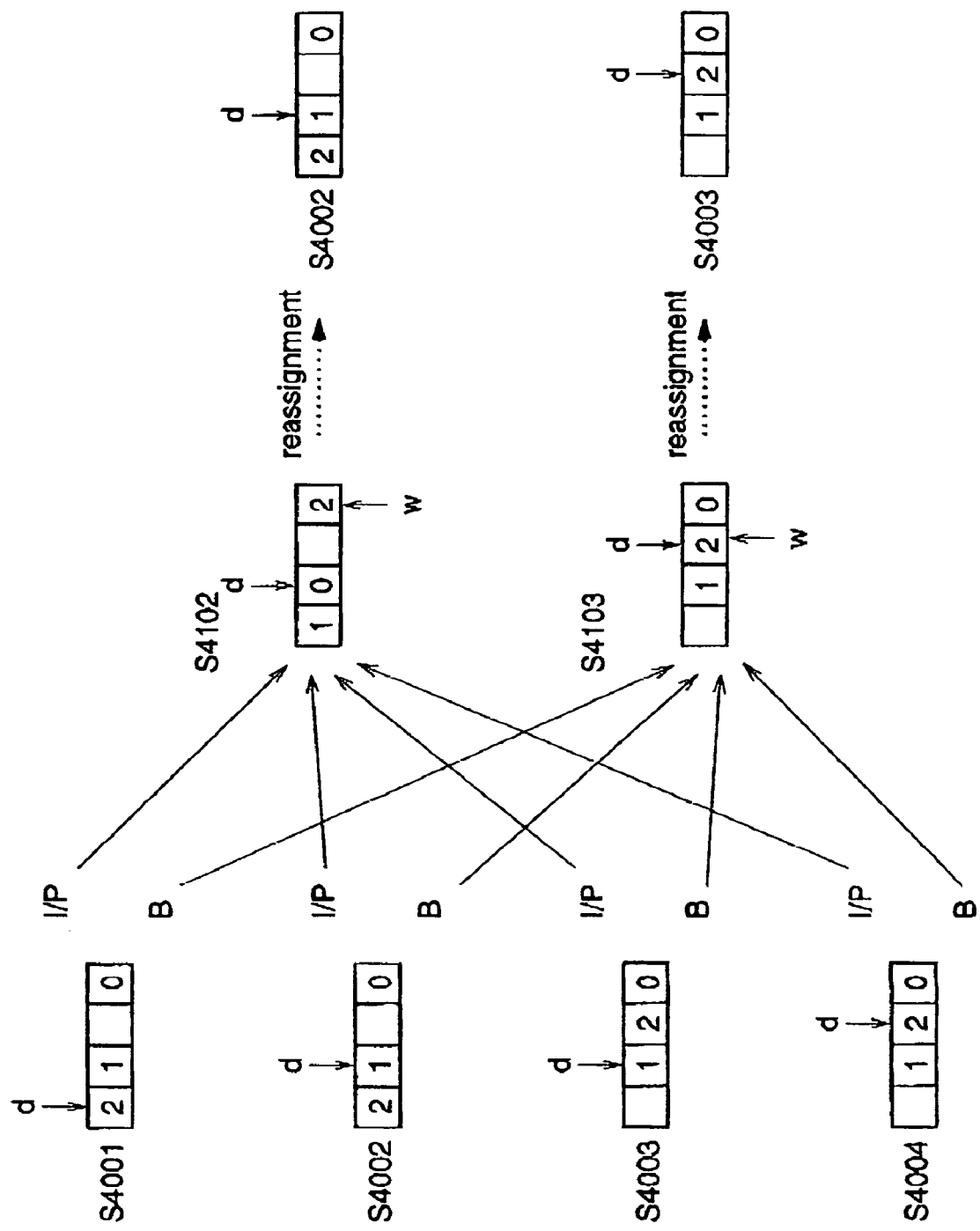
FIG. 4 is a state transition diagram showing details of display setting at normal decoding in the control flowchart of FIG. 2 in the case where a frame memory corresponds to three frames.

In FIG. 2, the operation starts in step S2001. In step S2002, the video display control circuit 1007 stands by up to a decode starting position. When the decode starting position is reached, the circuit 1007 perform display setting, thereby provisionally setting an output buffer that is used for display and deciding an output buffer that is used for decoding I2 coded data (step 92003). The details of this setting process are shown in FIG. 4.

Thereafter, the operation proceeds to step S2004, and the decoding count circuit 1009 sets a skip decoding field counter s, i.e., the number of fields corresponding to a picture to be skipped, at s=2K−f1=4 using K that is a factor by which the reproduction speed is multiplied (K=3) and f1 that is the number of provisional display fields (f1=2).

Then, in step S2005, the video display control circuit 1007 instructs the multi-stage decoding control circuit 1008 of a decoding process for I2 coded data and, upon receipt of this instruction, the multi-stage decoding control circuit 1008 instructs the video decoding circuit 1001 to decode the I2 coded data. Then, in step S2006, completion of the decoding of one frame is waited.

When decoding of one frame is completed, the value of the skip decoding field counter s is judged in step S2007. As s=4>0 in this case, the operation proceeds to step S2010, and the format of coded data corresponding to the picture to be skipped is judged. Since code data following the I2 coded data is B0 coded data, the operation proceeds to step S2015, in which the number f2 of display fields corresponding to B0 picture (f2=2) is subtracted from s, resulting in s=2.

Then, In step S2016. B0 coded data is skipped, and then the value of s is judged again in step S2007. As s=2>0, the operation proceeds to step S2010 again, in which the coded data format of a picture to be skipped is judged. Since coded data following the B0 coded data is B1 coded data, the operation proceeds to step S2015, and the number f2 of display fields corresponding to B1 picture (f2=2) is subtracted from a, resulting in s=0.

In step S2016, the B1 coded data is skipped, and then the value of s is judged again in step S2007. As s=0, the operation proceeds to step S2008, thereby judging whether all coded data have been decoded or not. Since all coded data have not been decoded yet, the operation returns to step S2002.

Thereafter, decoding of P6 coded data that is subsequently inputted, and display of I or P picture that has been decoded immediately before the P6 coded data, i.e., I2 picture is performed.

In step S2002, the video display control circuit 1007 stands by up to a decode starting position, and when the decode starting position is reached, the circuit 1007 performs display setting, thereby setting an output buffer to be used for decoding of P6 coded data and setting display of I2 picture (step S2003). Then, the operation proceeds to step S2004, and the skip decoding field counter s is set at s=2K−f1=4, using K that is a factor by which the reproduction speed is multiplied (K=3), and f1 that is the number of display fields corresponding to I2 picture (f1−2).

Then, in step S2005, the video display control circuit 1007 instructs the multistage control circuit 1008 of decoding of the P6 coded data, and upon receipt of this instruction, the multistage control circuit 1008 instructs the video decoding circuit 1001 to decode the P6 coded data. Then, in step S2006, completion of decoding of one frame is waited.

When decoding of one frame is completed, the value of the skip decoding field counter s is judged in step S2007. As s=4>0 in this case, the operation proceeds to step S2010, thereby judging the coded data format of a picture that is to be skipped. Since coded data following the P6 coded data is B3 coded data, the operation proceeds to step S2015, in which the number f2 of display fields corresponding to B3 picture (f2=2) is subtracted from s, resulting in s=2.

In step S2016, the B3 coded data is skipped, and then the value of s is judged again in step S2007. As s=2>0, the operation proceeds again to step S2010, and then the coded data format of a picture to be skipped is judged. Since coded data following the B3 coded data is B4 coded data, the operation proceeds to step S2015, in which the number f2 of display fields corresponding to B4 picture (f2=2) is subtracted from s, resulting in s=0.

In step S2016, the B4 coded data is skipped, and then the value of s is judged again in step S2007. As s=0, the operation proceeds to step S2008, thereby judging whether all coded data have been decoded or not. Since all coded data have not been decoded yet, the operation returns to step S2002.

Thereafter, decoding and display of B5 coded data that is subsequently inputted is performed.

In step S2002, the video display control circuit 1007 stands by up to a decode starting position. When the decode starting position is reached, the circuit 1007 executes display setting, thereby deciding an output buffer that is used for display and decoding of B5 picture (step S2003). Then, the operation proceeds to step S2004, thereby setting the skip decoding field counter s as s=2K−f1=4 using K that is a factor by which the reproduction speed is multiplied (K=3) and f1 that is the number of display fields corresponding to B5 picture (f1=2).

Thereafter, in step S2005, the video display control circuit 1007 instructs the multistage decoding control circuit 1008 of decoding of the B5 coded data, and uponreceipt of this instruction, the multi-stage decoding control circuit 1008 instructs the video decoding circuit 1001 to decode the B5 coded data. Then in step S2006, completion of decoding of one frame is waited.

Figure 5:
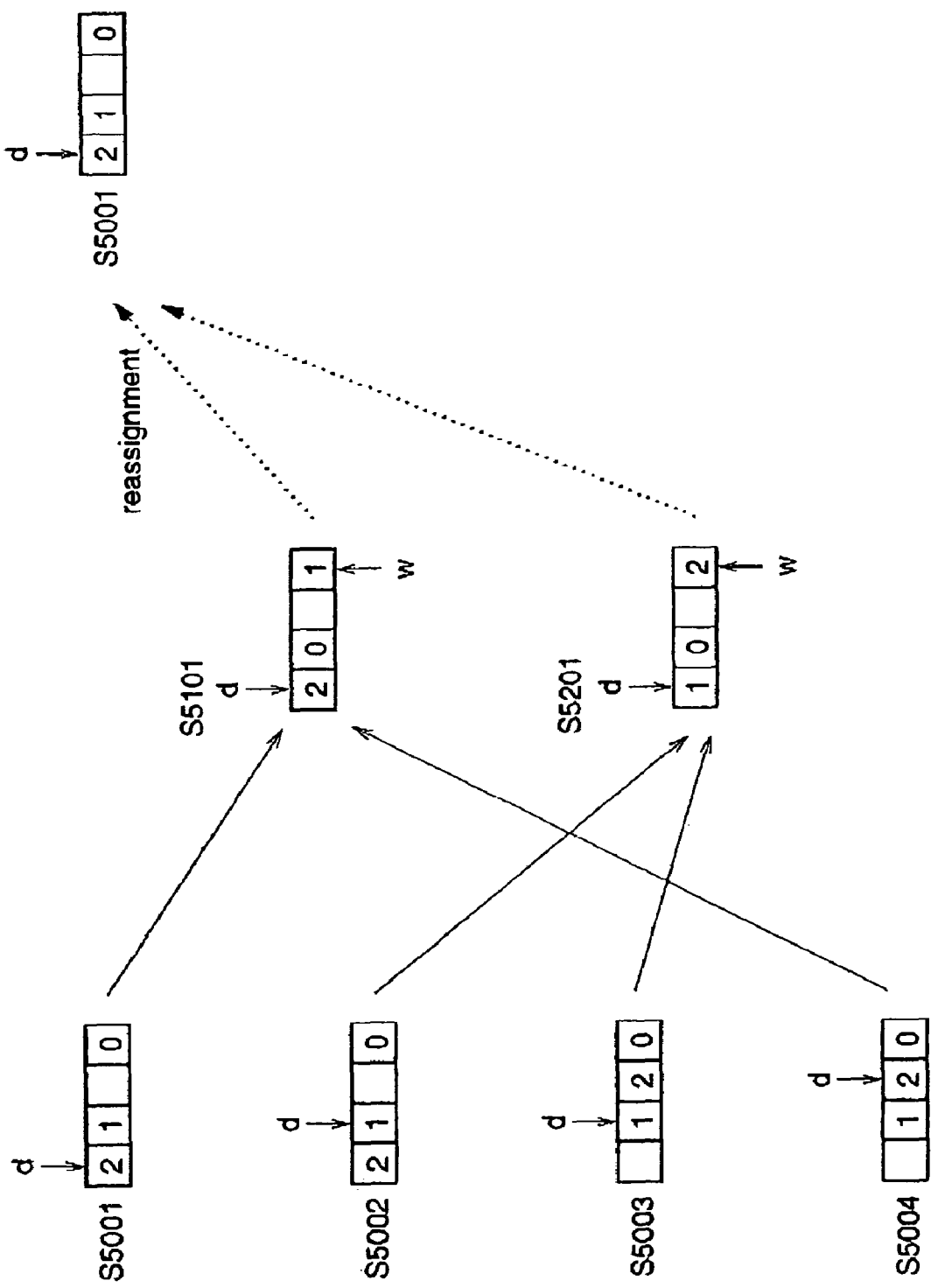
FIG. 5 is a state transition diagram showing details of setting of a skip decoding output buffer at skip decoding in the control flowchart of FIG. 2 in the case where the frame memory corresponds to three frames.

When the decoding of one frame is completed, the value of the skip decoding field counter s is judged in step S2007. As s=4>0 in this case, the operation proceeds to step S2010, thereby judging the coded data format of a picture to be skipped. Since coded data following the B5 coded data is P8 coded data, the operation proceeds to step S2011, in which setting of an output buffer for skip decoding is executed to decide an output buffer that is used for decoding of the P8 coded data. The details of this setting are shown in FIG. 5.

Then, the operation proceeds to step S2012, and the number f2 of display fields corresponding to I or P picture that has been decoded immediately before the P8 coded data, i.e., P6 picture, is subtracted from s (in this case, f2=2), resulting in s=2.

Thereafter, in step S2013, the Multi-stage decoding control circuit 1008 instructs the video decoding circuit 1001 to decode the P8 coded data, and then completion of decoding of one frame is waited (step S2014).

When the decoding of one frame is completed, the value of a is judged again in step S2007. As s=2>0, the operation proceeds to step S2010, thereby judging the coded data format corresponding to a picture to be skipped. Since coded data following the P8 coded data is B7 coded data, the operation proceeds to step S2015, and then the number f2 of display fields corresponding to the B7 picture is subtracted from s (in this case, f2=2), resulting in s=0.

Thereafter, in step S2016, the B7 coded data is skipped, and then the value of 6 is judged again in step S2007. As s=0, the operation proceeds to step S2008, thereby judging whether all coded data have been decoded or not. Since all coded data have not been decoded yet, the operation returns to step S2002.

Thereafter, decoding of P11 coded data that is subsequently inputted, and display of I or P picture that has been decoded immediately before the P11 coded data, i.e., P8 picture is executed.

The reproduction processes for coded data that are subsequent to the P11 coded data are the same as the procedure that has been described above.

As described above, a desired stable high-speed reproduction can be achieved by skipping display of pictures of the predetermined number of fields with using a memory buffer corresponding to three frames.

Figure 13:
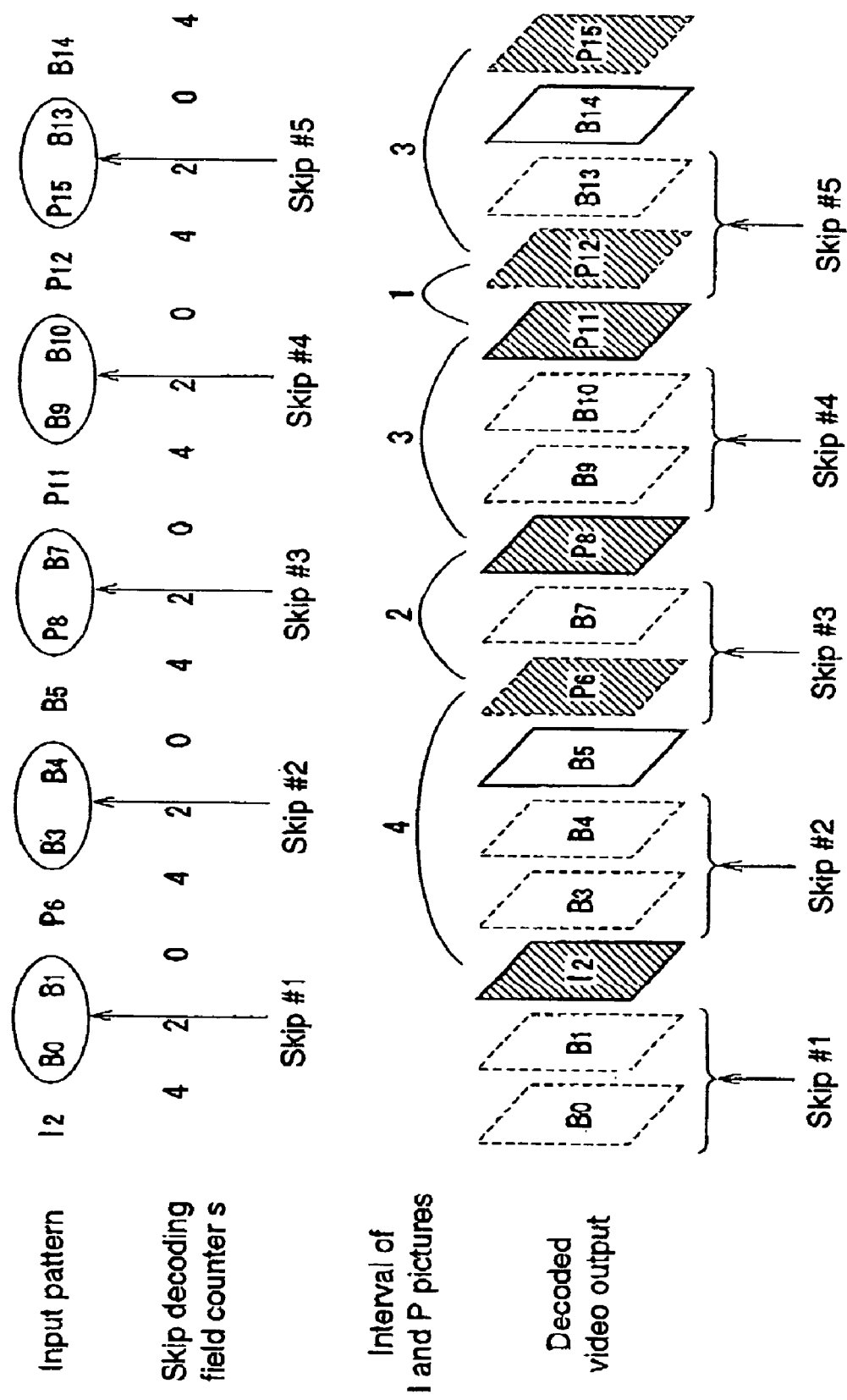
FIG. 13 is a diagram for explaining a manner in which triple speed reproduction is executed by the image signal reproduction apparatus according to the first embodiment.

FIG. 13 illustrates triple speed reproduction that is realized by executing the normal decoding process and the skip decoding process to the input pattern of the coded stream as shown in FIG. 12 (i.e., input pattern as shown at the upper part of FIG. 13) in accordance with the control flowchart shown in FIG. 2.

Figure 3:
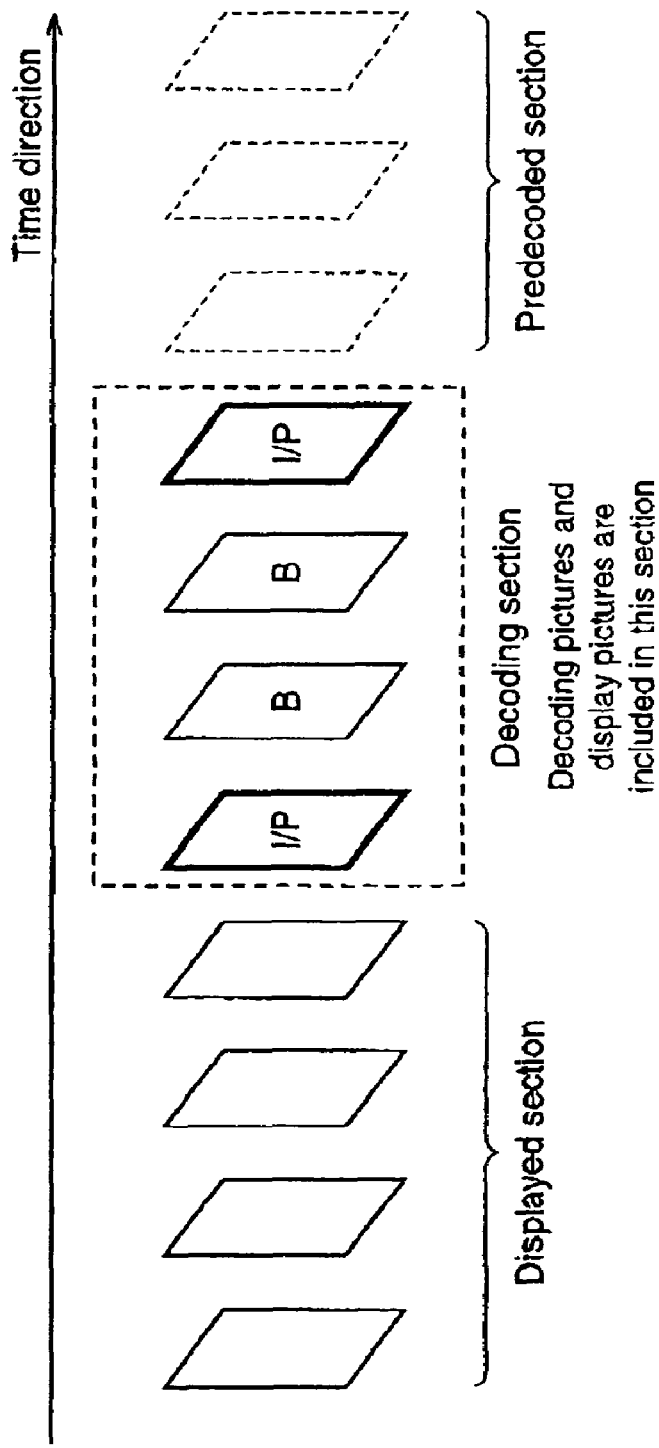
FIGS. 3(a) and 3(b) are diagrams illustrating a model of a method for assigning output buffers corresponding to three frames in the image signal reproduction apparatus shown in figure
Figure 3:
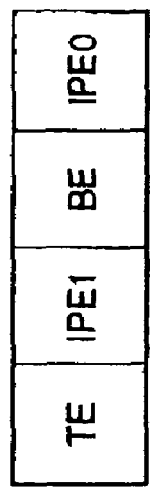

Next, the display setting in step S2003 and the setting of an output buffer for skip decoding in step S2011 in FIG. 2 will be described with reference to a layout model as shown in FIG. 3.

FIG. 3(a) is a diagram for explaining a decoding process for reproducing a MPEG2 coded video stream. As shown in FIG. 3(a), in the process for reproducing a MPEG2 coded stream, reproduction pictures can be divided into three sections along a time axis, i.e., a displayed section, a decoding section, and a predecoded section.

The displayed section includes pictures that have already been displayed.

The decoding section is a section to which the decoding process is being performed, and includes pictures that are necessary for the decoding process. The head of the time axis in the decoding section is I picture or P picture, and the rear end of the time axis in the decoding section is I picture or P picture that has been decoded immediately before the I picture of P picture at the head of the time axis.

The picture at the rear end of the time axis is referred to at the decoding of forward prediction coding, and the picture at the head of the time axis is referred to at the decoding of backward prediction coding.

There are one or plural B pictures between the picture at the rear end of the time axis and the picture at the head of the time axis. There are some cases where no B picture is included.

The predecoded section includes pictures that are not decoded yet.

A layout of output buffers corresponding to three frames according to the reproduction process for the MPEG2 coded video stream as shown in FIG. 3(a) is schematically shown in FIG. 3(b).

FIG. 3(b) is a diagram schematically illustrating a layout of output buffers corresponding to three frames, in which four entries TE, IPE1, BE, and IPE0 are included.

TE denotes a displayed picture, which represents the pictures included In the displayed section in FIG. 3(a).

IPE1 denotes an I picture or P picture at the rear end of the decoding section in FIG. 3(a), which Is referred to at the decoding of forward prediction coding.

BE denotes a B picture in the decoding section of FIG. 3(a).

IPE0 denotes an I picture or P picture at the front end of the decoding section in FIG. 3(a), which is referred to at the decoding of backward prediction coding.

One output buffer is always assigned to the two entries IPE0 and IPE1, respectively. Therefore, the remaining one buffer is assigned to either TE or BE.

Next, details of the display setting in step S2003 shown in FIG. 2 will be described with reference to FIG. 4.

FIG. 4 shows transition of states of the data layout in the normal reproduction decoding process based on the schematic diagram of FIG. 3(b). The output buffers corresponding to three frames are represented by provisional identifiers 0, 1, and 2. An identifier d is attached to an output buffer that is used for display, while an identifier w is attached to an output buffer that is used for decoded data output.

These provisional identifiers 0, 1, and 2, indicating the output buffers are intended to represent states of the buffers and, in practice, the identifiers of the output buffers are employed.

When output buffers correspond to three frames, there are only four states, i.e., state S4001, state S4002, state S4003, and state S4004.

In the normal reproduction decoding, when I or P coded data is to be decoded, any of the states S4001, S4002, S4003, and S4004 changes into state S4102, in which reassignment, designation of display, and designation of decoded data output for the output buffers is performed.

When the provisional identifiers 0, 1, and 2 of the state S4102 are reassigned, the state S4002 is realized.

When the P11 coded data as shown In FIG. 13 is decoded, a state immediately before step S2003 is state S4001, in which the provisional identifier 0 is assigned to an output buffer that contains P8 picture, the provisional identifier 1 is assigned to an output buffer that contains P6 picture, and the provisional identifier 2 is assigned to an output buffer that contains B5 picture.

The state S4001 is changed into a state S4102 due to the display setting in step S2003. In state S4102, the provisional identifier 2 is reassigned to an output buffer that contains P11 picture, an output buffer that contains P8 picture is set to be used for display, the output buffer that contains P11 picture is set as a decoded data output destination, and the output buffer that contains P8 picture is set to be referred to at forward prediction decoding.

Thereafter, the provisional identifiers 0, 1, and 2 are reassigned to the output buffers containing P11 picture, P8 picture, and P6 picture, respectively, resulting in state S4002.

In the normal reproduction decoding process, when B coded data is to be decoded, any of the states S4001, S4002, S4003, and S4004 changes into state S4103, in which the reassignment, designation of display, and designation of decoded data output for the output buffers is executed.

When the provisional identifiers 0, 1, and 2 of the state S4103 are reassigned, state S4003 is obtained.

When B5 coded data as shown in FIG. 13 is decoded, a state immediately before step S2003 is the state S4002, in which the provisional identifier 0 is assigned to an output buffer that contains P6 picture, and the provisional identifier 1 is assigned to an output buffer that contains I2 picture. In this case, no output buffer is assigned to the provisional identifier 2.

The state S4002 is changed into state S4103 due to the display setting process in step S2003. In the state S4103, the provisional identifier 2 is reassigned to an output buffer that contains B5 picture, the output buffer that contains B5 picture is set to be used for display and decoding data output, while an output buffer that contains I2 picture and an output buffer that contains P6 picture are set to be referred to at forward prediction decoding and at backward prediction decoding, respectively.

Thereafter, when the provisional identifiers 0, 1, and 2 are reassigned to output buffers that contain P6 picture, I2 picture, and B5 picture, respectively, the state S4103 changes into a state S4003.

Next, details of the setting of an output buffer for skip decoding in step S2011 of FIG. 2 will be described with reference to FIG. 5.

FIG. 5 shows transition of states of data layout in the skip decoding process based on the schematic diagram of FIG. 3(b). Output buffers corresponding to three frames are represented by provisional identifiers 0, 1 and 2, and an identifier d is attached to an output buffer that is used for display while an identifier w is attached to an output buffer that is used for decoded data output.

The provisional identifiers 0, 1 and 2 indicating the output buffers are intended to represent their states and, in practice, the identifiers of the output buffers are employed.

When the output buffers correspond to three frames, there exist only four states, i.e., states S5001, S5002, S5003, and S5004.

In the skip decoding process, only I or P coded data are decoded. At the decoding, the state S5001 and the state S5004 changes into a state S5101, and the state S5002 and the state S5003 changes into a state S5201, thereby implementing reassignment, designation of display, and designation of decoding data output for the output buffers. The output buffer that is designated for use to display is not changed at this transition.

When the provisional identifiers of the states S5101 and S5201 are reassigned, the state S5001 is obtained.

When P8 coded data as shown in FIG. 13 is decoded, a state immediately before step S2011 is the state S5004, wherein the provisional identifier 0 is assigned to an output buffer that contains P6 picture, the provisional identifier 1 is assigned to an output buffer that contains I2 picture, and the provisional identifier 2 is assigned to an output buffer that contains B5 picture.

The state S5004 is changed into a state S5101 due to setting of output buffer for skip decoding in step S2011. In the state S5101, the provisional identifier 1 is reassigned to the output buffer that contains P8 picture, the output buffer that contains B5 picture remains set to be used for display, the output buffer that contains P8 picture is set to as a decoded data output destination, and the output buffer that contains P6 picture is set to be referred to at forward prediction decoding.

Therefore, when the provisional identifiers 0, 1, and 2 are reassigned to the output buffers that contain P8 picture, P6 picture, and B5 picture, respectively, the state S5101 changes into the state S5001.

In other words, the above description Indicates that, according to the present invention, a memory buffer corresponding to three frames would be sufficient to perform desired image data processing.

As described above, the image signal reproduction apparatus according to the first embodiment includes the video decoding circuit, the output buffers corresponding to three frames, the multi-stage decoding control circuit, the decoding count circuit for counting the number of skip decoding fields, and the like. Therefore, each time decoded data that is stored in the output buffer corresponding to one frame is outputted in synchronization with a sync signal, this image signal reproduction apparatus executes an operation of decoding coded data of I or P picture that is not displayed but is referred to, thereby successively writing the decoded data over the output buffer, while skipping coded data of B picture that is not displayed nor referred to, by using the remaining output buffers corresponding to two frames, repeatedly twice in total. Accordingly, this apparatus can realize high-speed reproduction of image signals at a uniform triple speed with stability.

It is needless to say that the present invention is applicable not only to a video stream coded by a MPEG method such as MPEG1, MPEG2, or MPEG4, but also to other video stream coded by a coding method including a picture that has been prediction-coded using the immediately preceding predictive coded reference picture and is referred to at prediction coding, and a picture that has been prediction-coded using the immediately preceding or following predictive coded reference picture and is not referred to at prediction coding.

Embodiment 2

Figure 6:
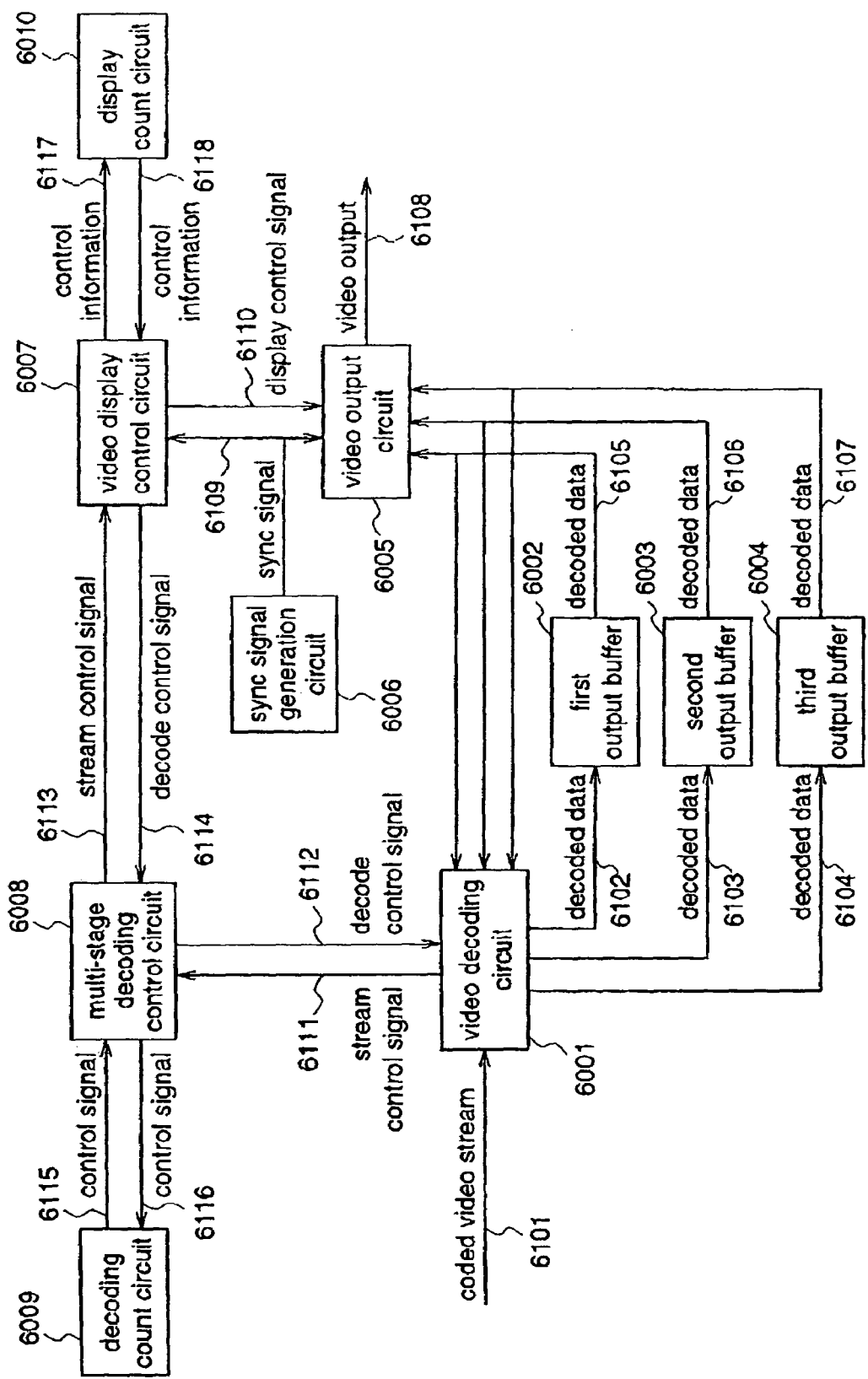
FIG. 6 is a block diagram illustrating an entire construction of an image signal reproduction apparatus according to a second embodiment of the present invention.

FIG. 6 is a block diagram illustrating an entire construction of an image signal reproduction apparatus according to a second embodiment of the present invention.

As shown in FIG. 6, an image signal reproduction apparatus according to the second embodiment decodes a coded video stream, and is constituted by a video decoding circuit 6001, a video display control circuit 6007, a video output circuit 6005, a sync signal generation circuit 6006, a multi-stage decoding control circuit 6008, a display count circuit 6010, and a decoding count circuit 6009. This embodiment is characterized by the multistage decoding control circuit 6008, and the display count circuit 6010, and the decoding count circuit 6009.

The sync signal generation circuit 6006 outputs a NTSC or PAL video sync signal 6109.

The video decoding circuit 6001 receives a coded video stream 6101, and outputs a stream control signal 6111 that is extracted from the coded video stream 6101 to the multi-stage decoding control circuit 6008, as well as decodes the coded video stream 6101. This decoding is performed in accordance with a decode control signal 6112 outputted from the multi-stage decoding control circuit 6008.

Data decoded by the video decoding circuit 6001 (decoded data) is outputted to a first output buffer 6002, a second output buffer 6003, or a third output buffer 6004.

These three output buffers 6002 to 6004 store the decoded data that are inputted from the video decoding circuit 6001, and outputs the stored decoded data to the video decoding circuit 6001 or the video output circuit 6005.

The video output circuit 6005 converts the decoded data 6105, 6106, and 6107 from the first, second, and third output buffers 6002, 6003, and 6004, respectively, into a final video output signal 6108. This conversion is performed in accordance with a display control signal 6110 that is outputted from the video display control circuit 6007.

Then, the display count circuit 6010 generates control Information 6118 for changing the number of time of decoding for coded data at intervals of a predetermined number of display pictures in accordance with control information 6117 from the video display control circuit 6007, and outputs the generated control information 6118 to the video display control circuit 6007. In this second embodiment, the number of times of decoding corresponds to a factor by which the decoding speed or the reproduction speed is multiplied.

The decoding count circuit 6009 generates a control signal 6115 for skipping a predetermined number of coded data in accordance with a control signal 6116 from the multi-stage decoding control circuit 6008, and outputs the generated control signal 6115 to the multi-stage decoding control circuit 6008.

The multi-stage decoding control circuit 6008 generates the decode control signal 6112 for the video decoding circuit 6001, a stream control signal 6113 for the video display control circuit 6007 and the control signal 6116 for the decoding count circuit 6009 on the basis of the stream control signal 6111 from the video decoding circuit 6001, a decode control signal 6114 from the video display control circuit 6007, and the control signal 6115 from the decoding count circuit 6009, respectively.

Figure 7:
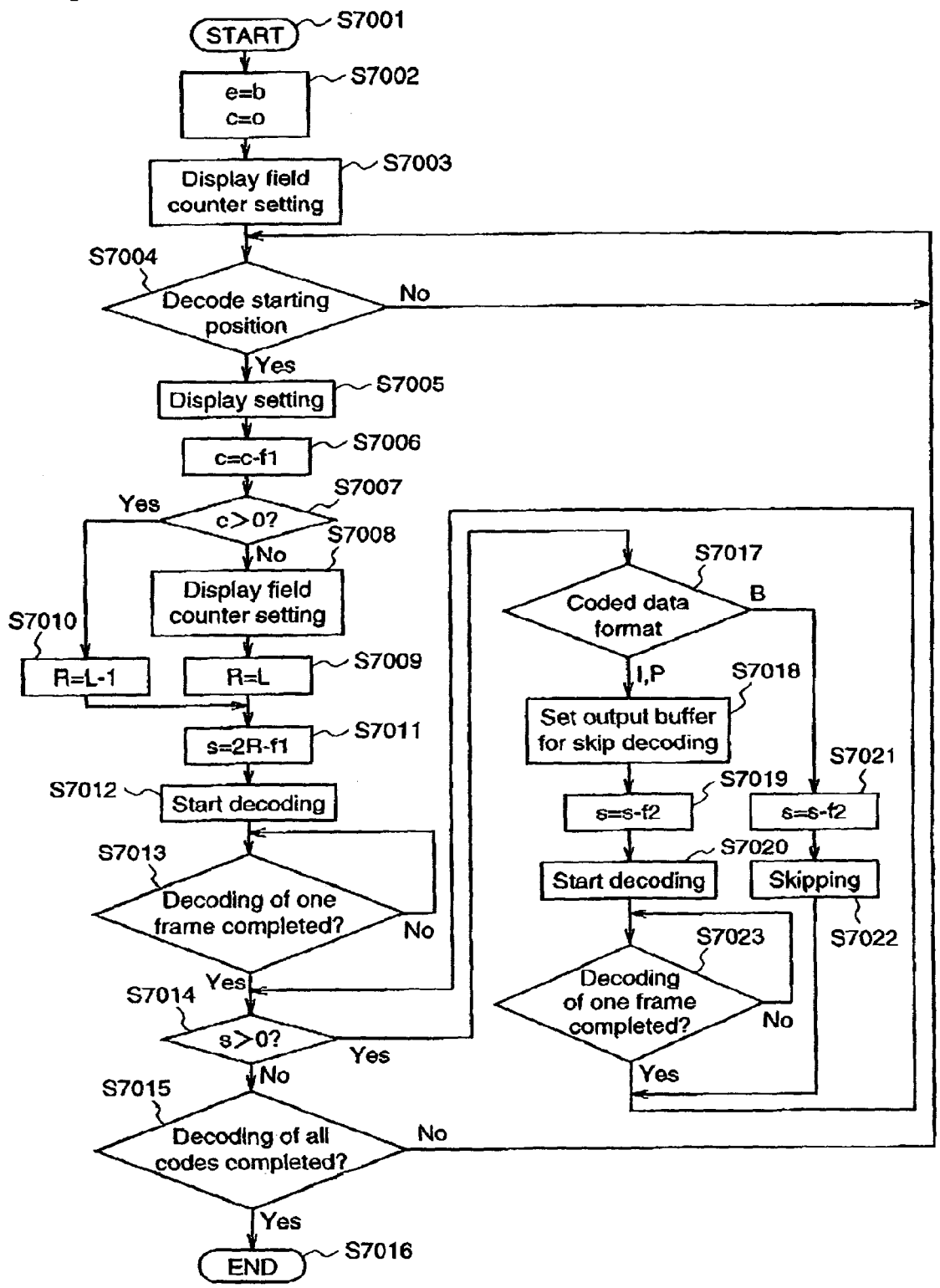
FIG. 7 is a flowchart for explaining a high-speed operation of the image signal reproduction apparatus shown in FIG. 6, showing control by a video display control circuit, a display count circuit, and a decoding count circuit.

The operation of the image signal reproduction apparatus according to the second embodiment will be specifically described, mainly focusing attention on operations of the video display control circuit 6007, the multi-stage decoding control circuit 6008, the decoding count circuit 6009, and the display count circuit 6010, with reference to a control flowchart as shown in FIG. 7.

In the following description, the operation at 1-fold speed reproduction is omitted, and only the operation at high-speed reproduction is explained.

FIG. 7 is a flowchart schematically showing the operation of the image signal reproduction apparatus according to the second embodiment.

In FIG. 7, the operation starts in step S7001, and in step S7002, the display count circuit 6010 initializes the display field counter c in the circuit 6010 at zero. Then, in step S7003, the display count circuit 6010 performs display field counter setting for adding, to the display field counter c, the number of fields (=the number of frames k×2) that will be displayed until the number of times of decoding is changed.

In this setting process, for example when it is assumed that a=3, b=2, and the factor L by which the decoding speed is multiplied=3, and the actual reproduction speed is 5/2 (L−2+a/b=1+3/2)-fold reproduction speed, the number k of frames to be displayed is set at 2, and the display field counter c is set at 2 k=4. The details of the process will be described later with reference to FIG. 8.

Hereinafter, the picture skip control started from a state wherein the display field counter c=4 will be described with reference to the input pattern as shown in FIG. 12.

In step S7004 in FIG. 7, the video display control circuit 6007 stands by up to a decode starting position. When the decode starting position is reached, the circuit 6007 performs the display setting, thereby provisionally setting an output buffer that is used for display, and deciding an output buffer that is used for decoding of I2 coded data (stop S7005). The details of the setting process are shown in FIG. 4.

Thereafter, in step S7006, the number f1 of provisional display fields (f1=2) is subtracted from the display field counter c in the display count circuit 6010, resulting in c=2. Then in step S7007, the value of the display field counter c is judged. As c=2>0, the operation proceeds to step S7010, thereby setting the number R of times of decoding at L−1=2, and then the operation proceeds to step S7011. In step S7011, the decoding count circuit 6009 sets the skip decoding field counter A, which is the number of fields corresponding to a picture that is to be skipped, at 2R−f1=2.

Thereafter, in step S7012, the video display control circuit 6007 instructs the multi-stage decoding control circuit 6008 of decoding of I2 coded data, and upon receipt of this instruction, the multi-stage decoding control circuit 6008 instructs the video decoding circuit 6001 to decode the I2 coded data. Then, completion of decoding of one frame is waited in step S7013.

When the decoding of one frame is completed, the value of the skip decoding field counter s is judged (step S7014). As s=2>0 in this case, the operation proceeds to step S7017, thereby judging the coded data format of a picture to be skipped. Since coded data following the I2 coded data is B0 coded data, the operation proceeds to step S7021, wherein the number f2 of display fields corresponding to B0 picture (f2=2) is subtracted from s, resulting in s=0.

In step S7022, the B0 coded data is skipped, and then the value of s is judged again in step S7014. As s=0, the operation proceeds to step S7015, thereby judging whether all coded data have been decoded or not. Since all coded data have not been decoded yet, the operation returns to step S7004.

Thereafter, decoding and display of subsequently inputted B1 coded data is executed.

Figure 8:
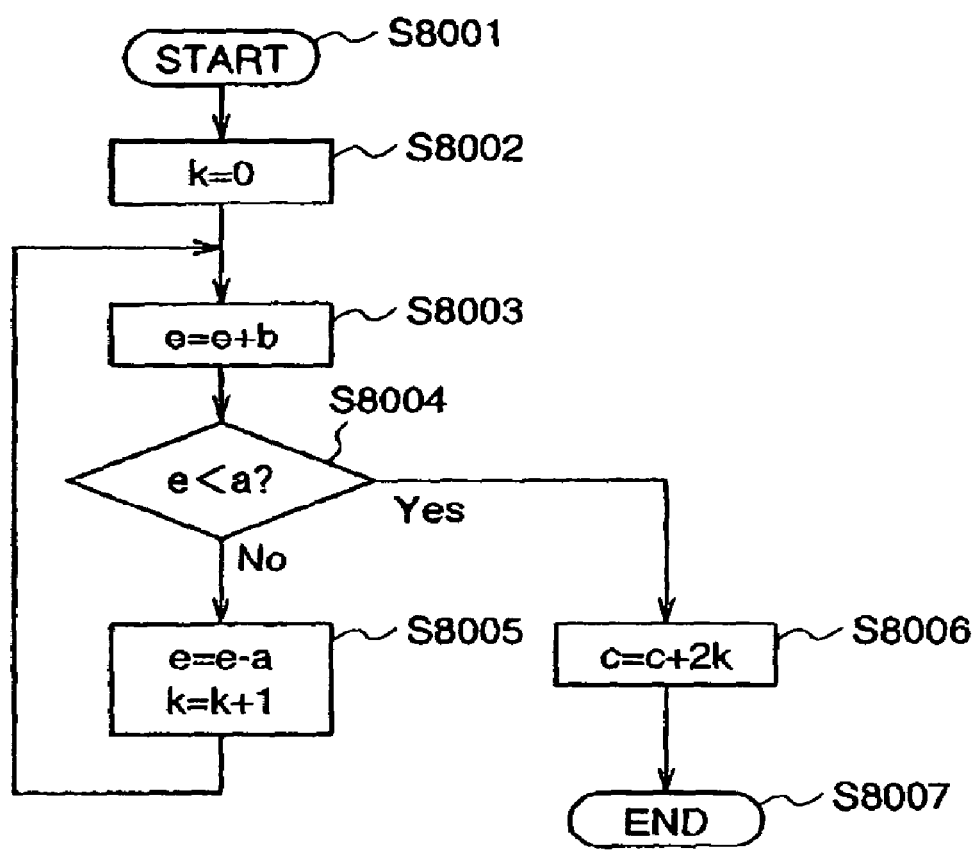
FIG. 8 is a flowchart showing details of a display field counter setting in the control flowchart shown in FIG. 7.
Figure 9:
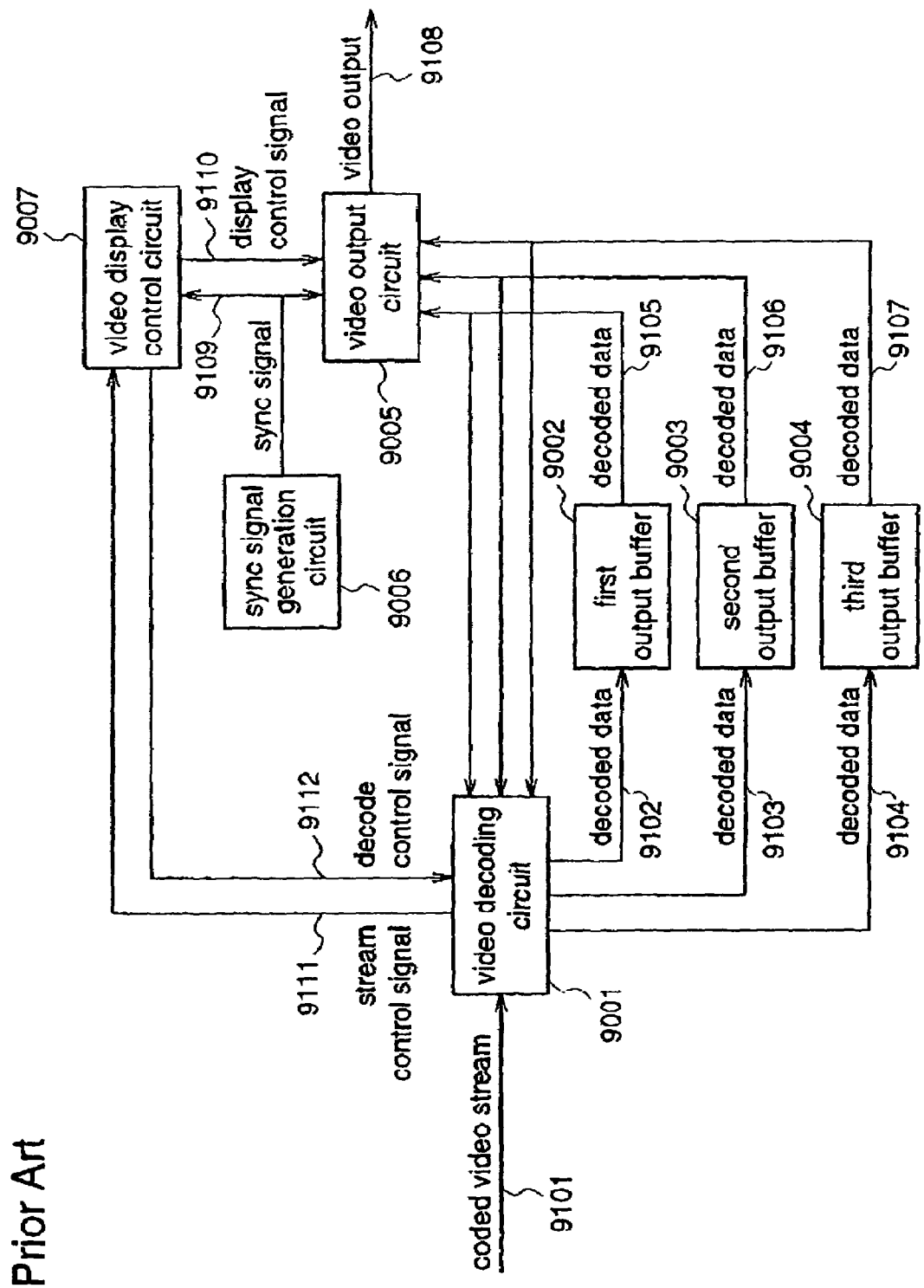
FIG. 9 is a block diagram illustrating an entire construction of a conventional image signal reproduction apparatus for MPEG decoding.
Figure 10:
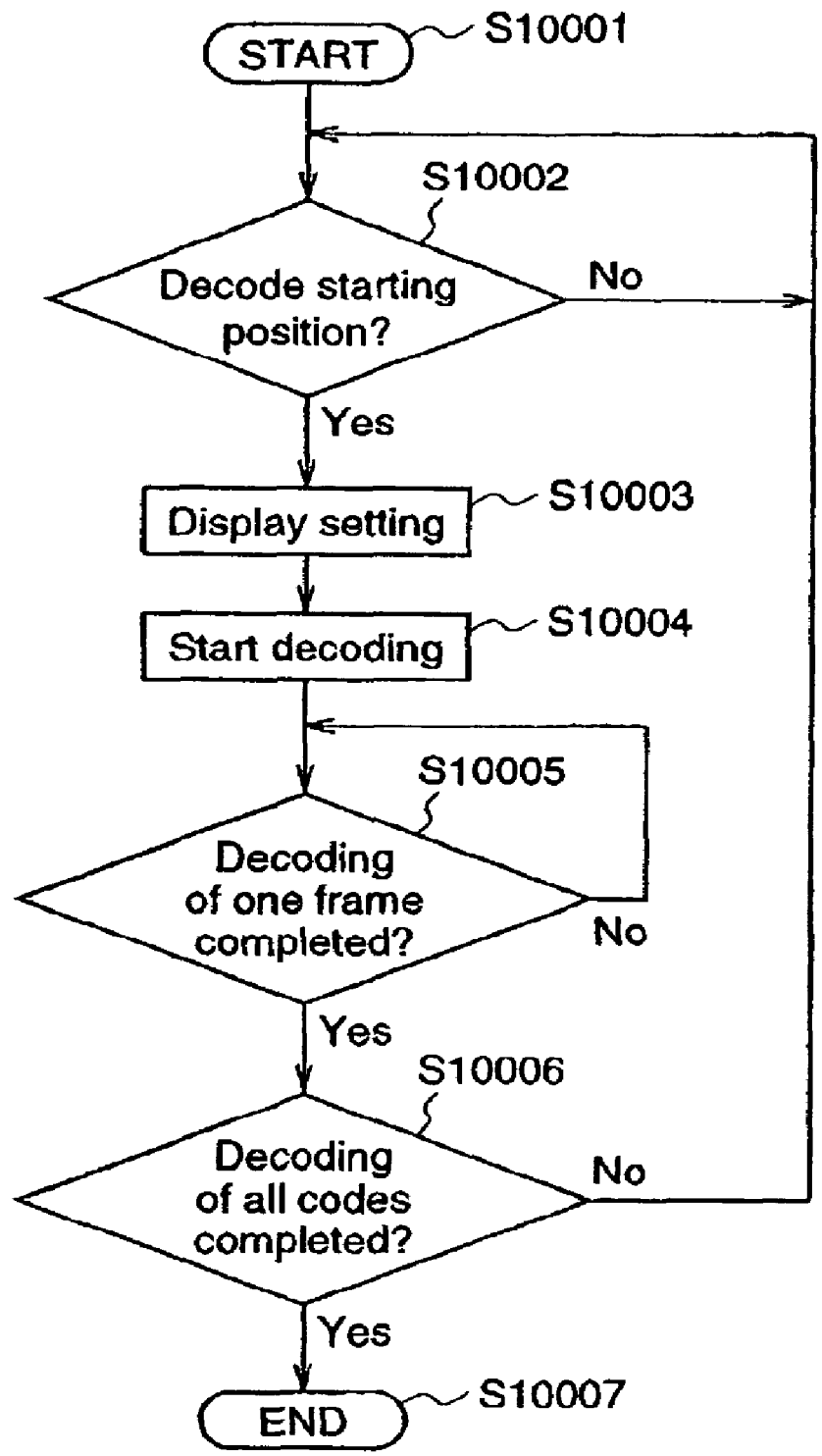
FIG. 10 is a control flowchart for explaining an operation of the conventional image signal reproduction apparatus at the decoding.
Figure 11:
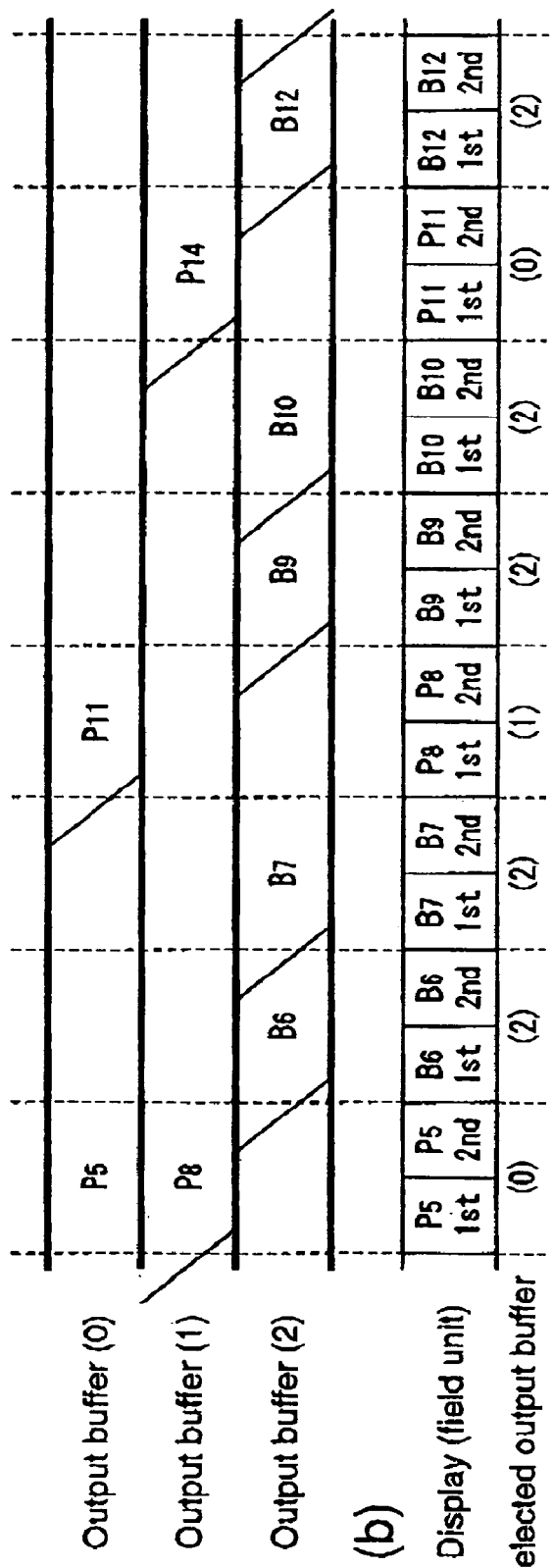
FIGS. 11(a) and 11(b) are diagrams for explaining a decoding operation and a display operation of the conventional image signal reproduction apparatus.

In step S7004, the video display control circuit 6007 stands by up to a decode starting position. When the decode starting position is reached, the video display control circuit 6007 performs the display setting in step S7005, thereby deciding output buffers that are used for display and for decoding of B1 coded data. Then in step S7006, the number f1 of display fields corresponding to B1 picture (f1=2) is subtracted from the display field counter c, resulting in c=0. Then in step S7007, the value of the display field counter c is judged. As c=0 in this case, the operation proceeds to step S7008, thereby performing display field counter setting of adding to the display field counter c, the number of fields that will be displayed until the number of times of decoding is changed next. The details of the setting process are shown in FIG. 8.

Thereafter, in step S7009, the number R of times of decoding is set at L=3, and then the operation proceeds to step S7011, wherein the skip decoding field counter a is set at 2R−f1=4. Thereafter, in step S7012, the video display control circuit 6007 instructs the multi-stage decoding control circuit 6008 of decoding of B1 coded data, and upon receipt of this instruction, the multi-stage decoding control circuit 6008 instructs the video decoding circuit 6001 to decode the B1 coded data. Then, completion of decoding of one frame is waited in step S7013.

When the decoding of one frame is completed, the value of skip decoding field counter a is judged in step S7014. As s=4>0, the operation proceeds to step S7017, thereby judging the coded data format of a picture that is to be skipped. Since coded data following the B1 coded data is P6 coded data, the operation proceeds to step S7018, in which setting of an output buffer for skip decoding is executed to decide an output buffer that is used for decoding of the P6 coded data. The details of this setting are shown in FIG. 5.

Thereafter, the operation proceeds to step S7019, in which the number f2 of display fields (f2=2) corresponding to I or P picture that has been decoded immediately before the P6 coded data, i.e., I2 picture is subtracted from s, resulting in s=2.

Then, in step S7020, the multi-stage decoding control circuit 6008 instructs the video decoding circuit 6001 to decode the P6 coded data. Then, completion of decoding of one frame is waited in step S7023.

When the decoding of one frame is completed, the value of s is judged again in step S7014. As s=2>0 in this case, the operation proceeds to step S7017, thereby judging the coded data format of a picture that is to be skipped. Since coded data following the P6 coded data is B3 coded data, the operation proceeds to step S7021, wherein the number f2 of display fields corresponding to the B3 picture (f2=2) is subtracted from s, resulting in s=0.

Thereafter, in step S7022, the B3 coded data is skipped, and then the value of s is judged again in step S7014. As s=0 in this case, the operation proceeds to step S7015, thereby judging whether all coded data have been decoded or not. Since all coded data have not been decoded yet, the operation returns to step S7004.

The reproduction process for coded data subsequent to B4 coded data is the same as the above-mentioned procedure.

As described above, triple speed reproduction and double speed reproduction is properly switched by employing the memory buffer corresponding to three frames. In other words, in this second embodiment, a desired stable non-integral multiple speed, i.e., 5/2-fold high speed reproduction can be achieved by repeating one time of the triple speed reproduction and one time of the double speed reproduction.

Figure 14:
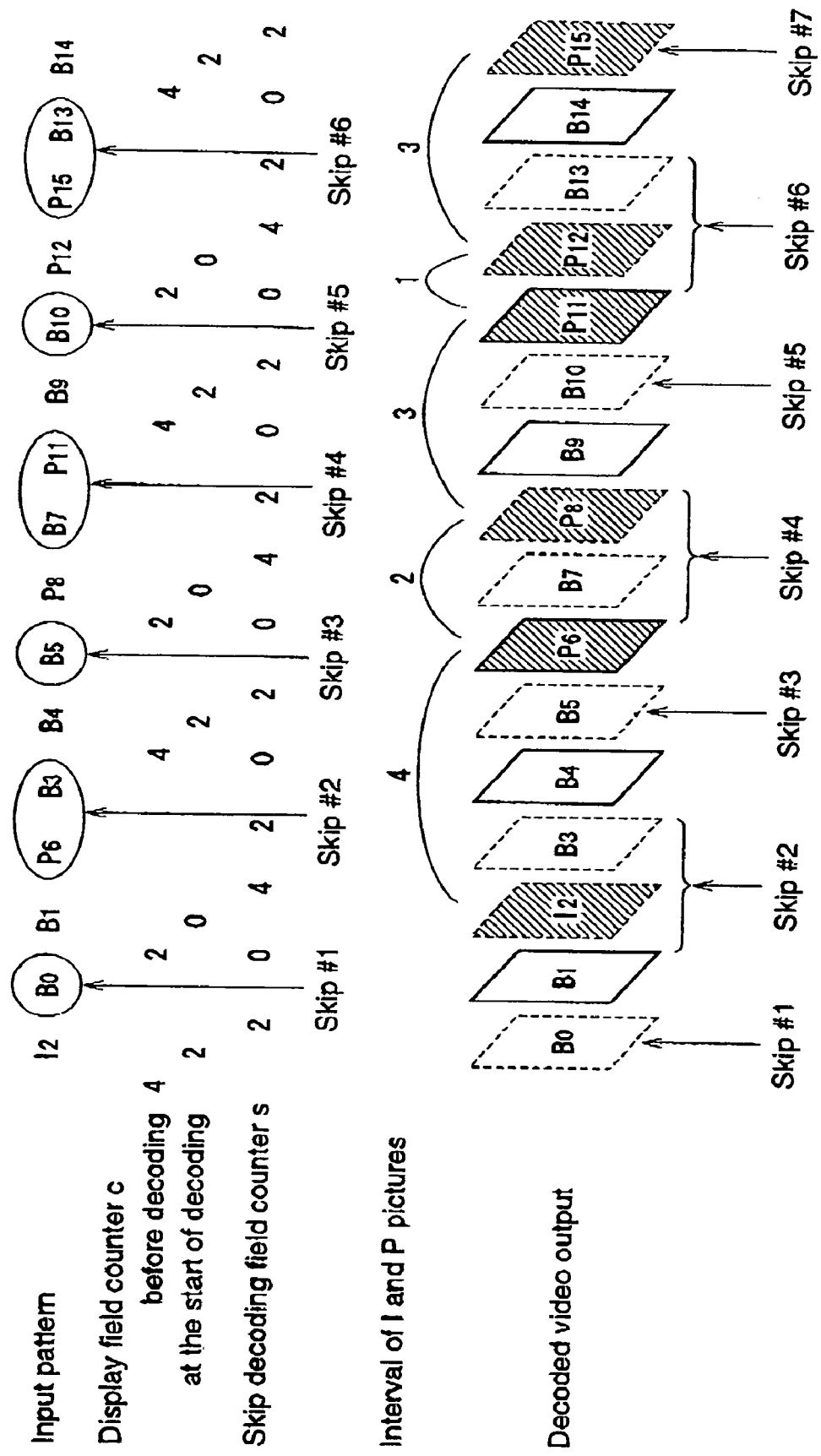
FIG. 14 is a diagram for explaining a manner in which 5/2-fold speed reproduction is executed by the image signal reproduction apparatus according to the second embodiment.

FIG. 14 illustrates 5/2-fold reproduction that is realized by executing the normal decoding process and the skip decoding process for the input pattern of the coded stream as shown in FIG. 12 (i.e., the input pattern as shown at the upper portion of FIG. 14), based on the control flowchart in FIG. 7.

Next, the details of the display field counter setting in steps S7003 and S7008 in FIG. 7 will be described with reference to FIG. 8.

At the display field counter setting in FIG. 8, when high speed reproduction at a speed ratio of L−2+a/b wherein the relationship between a and b is given by 1<a/b<2 is executed, setting of the display field counter c is obtained by utilizing a DDA (Digital Differential Analyzer) method between a start point (0, 0) and an end point (a, b), thereby stabilizing the reproduction speed. Hereinafter, the specific setting procedure will be described.

First, as an initial setting, c is set at zero, and a denominator b of the speed ratio is substituted for an accumulation error e in step S7002 of FIG. 7.

In the processing flowchart of FIG. 8, the operation is started from step S8801. Th n, in step S8002, a loop counter k that is the number of frames to be displayed is initialized at 0.

Next, in step S8003, the denominator b of the speed ratio is added to the accumulation error e.

In step S8004, the value of the accumulation error e is judged, thereby deciding whether or not the accumulation error e<the numerator a of the speed ratio.

When the accumulation error e<the speed ratio numerator a, the operation proceeds to step S8006, thereby adding a value that is twice as large as the loop counter k to the display field counter c. The value of the loop counter k is doubled to make it correspond to units of fields.

On the other hand, when the accumulation e is not smaller than the speed ratio numerator a, the operation proceeds to step S8005, thereby subtracting the speed ratio numerator a from the accumulation error e, and adding 1 to the loop counter k.

When c<0 in step S7006 of FIG. 7, i.e., when c=2 and the number f1 of display fields corresponding to a picture to be displayed is 3, c becomes −1 and thus the display field counter setting is executed in step S7008. At this time, in the display field counter setting of FIG. 8, the display field counter c is set at c+2k=−1+2×2=3 In step S8006. Therefore, the display picture interval up to the next changing of the number of times of decoding is set at a value that is one field shorter than the initial value c=4.

In the display field counter setting as shown in FIG. 8, when the speed ratio a/b (1<a/b<2) is set at 1200/1001 and the number L of times of decoding is set at 2, the frame rate is converted from NTSC system to PAL system.

Further, the display setting in step S7005 and the setting of an output buffer for skip decoding in step S7018 in FIG. 7 are the same as those in FIGS. 4 and 5 as described in the first embodiment.

As described above, the image signal reproduction apparatus according to the second embodiment includes the video decoding circuit, the output buffers corresponding to three frames, the multi-stage decoding control circuit, the decoding count circuit for counting the number of skip decoding fields, the video display control circuit, the display count circuit for counting the number of fields that are displayed by the video output circuit, and the like, and obtains the interval for switching the double speed reproduction and the triple speed reproduction for an inputted coded video stream based on the DDA method. Therefore, it is possible to properly switch the double speed reproduction and the triple speed reproduction, thereby realizing high-speed reproduction of image signals at a stable non-integral multiple speed, i.e., 5/2-fold speed.

It goes without saying that the present invention is applicable not only to a video stream coded by a MPEG method such as MPEG1, MPEG2, or MPEG4, but also to other video stream which is coded by a coding method including a picture that has been prediction-coded using the immediately preceding predictive coded reference picture and is referred to at prediction coding, and a picture that has been prediction-coded using the immediately preceding or following predictive coded reference picture and is not referred to at prediction coding.

Further, while the present invention has been described in detail with reference to the specific embodiments as shown in figures, this invention is not limited to the specific examples as those described in the above two embodiment, and various changes can be made to the embodiments without departing from the scope of the invention.

What is claimed is:

1. An image signal reproduction apparatus including:
a video decoding unit for decoding a coded video stream:
an output buffer for storing data decoded by the video decoding unit;
a video output unit for converting the decoded data that is stored in the output buffer into a final video output signal;
a decoding count unit for counting the number of skip decoding fields, the decoding in the video decoding unit of said fields being skipped;
a multistage decoding control unit for controlling the decoding or skipping thereof in the video decoding unit;
a video display control unit for controlling the control for the video decoding unit by the multistage decoding control unit and the conversion of the decoded data into the final video output signal by the video output unit; and
a sync signal generation unit for supplying a video sync signal to the video output unit and the video display control unit, wherein
said decoding count unit sets the number of skip decoding fields on the basis of a multiple reproduction speed for the coded video stream and the number of fields included in one frame image to be decoded, and counts down the set number of skip decoding fields each time a new frame Is inputted.
said video decoding unit skips decoding of the coded stream of a pictures that is not referred to, after the coded video stream corresponding to one frame has been decoded until the decoding count unit counts down the set number of skip decoding fields up to zero, and
when decoded data corresponding to said one frame is not referred to at prediction, said video output unit outputs the decoded data corresponding to said one frame in synchronization with the video sync signal, while when the decoded data corresponding to said one frame is referred to at prediction, said video output unit outputs decoded data that has been decoded immediately before said decoded data corresponding to said one frame and is referred to at prediction, in synchronization with the video sync signal.

2. The image signal reproduction apparatus of claim 1 wherein said output buffer stores decoded data corresponding to three frames, and said video decoding unit achieves K-fold speed reproduction by executing a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to two frames, while skipping a coded stream of a picture that is not displayed nor referred to, repeatedly by (K−1) times (K is an integer that meets K≧1).

3. An image signal reproduction apparatus including:

a video decoding unit for decoding a coded video stream;

an output buffer that store data decoded by the video decoding unit;

a video output unit for converting the decoded data stored in the output buffer into a final video output signal;

a decoding count unit for counting the number of skip decoding fields, the decoding in the video decoding unit of said fields being skipped;

a multistage decoding control unit for controlling the decoding or skipping in the video decoding unit;

a display count unit for counting the number of display fields that are used to display an image in the video output unit;

a video display control unit for controlling the control for the video decoding unit by the multi-stage decoding control unit and the conversion of the decoded data into the final video output signal by the video output unit; and a sync signal generation unit for supplying a video sync signal to the video output unit and the video display control unit, wherein said display count unit sets the number of display fields on the basis of a multiple reproduction speed for the coded video stream and the number of fields included in one frame image to be displayed, and count downs the set number of display fields each time an image is outputted by the video output unit, said decoding count unit changes the number of skip decoding fields according to the number of display fields on the basis of the multiple reproduction speed for the coded video stream and the number of fields included in one frame image to be decoded, and counts down the changed number of skip decoding fields each time a new frame is inputted, said video decoding unit skips decoding of a coded stream of pictures that are not referred to, after the coded video stream corresponding to one frame has been decoded until the decoding count units counts down the changed number of skip decoding fields up to zero, and when decoded data corresponding to said one frame is not referred to at prediction, said video output unit outputs the decoded data corresponding to said one frame in synchronization with the video sync signal, while when the decoded data corresponding to said one frame is referred to at prediction, said video output unit outputs decoded data that has been decoded immediately before said decoded data corresponding to said one frame and is referred to at prediction, in synchronization with the video sync signal.

4. The image signal reproduction apparatus of claim 3 wherein said output buffer stores decoded data corresponding to three frames, and said video decoding unit executes a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to two frame, while skipping a coded stream of a picture that is not displayed nor referred to, repeatedly by (L−2) times (L is an integer that meets L≧2) to achieve (L−1)-fold speed reproduction, or repeatedly by (L−1) times to achieve L-fold speed reproduction, said (L−1)-fold speed reproduction and said L-fold speed reproduction being properly switched, thereby achieving P-fold speed reproduction (L−1<P<L).

5. The image signal reproduction apparatus of claim 4 wherein the video display control unit performs control so that the execution of the (L−1)-fold speed reproduction and the execution of the L-fold speed reproduction are carried out at a ratio of p:(1-p) (0<p<1), thereby setting the reproduction speed for the Coded video stream at (L-p)-fold speed.

6. The Image signal reproduction apparatus of claim 4 wherein the display count unit obtains an interval for switching the (L−1)-fold speed reproduction and the L-fold speed reproduction by a digital differential analyzer method using a combination of integers a and b having a relationship of 1<a/b<2, and the video display control unit sets the reproduction speed for the coded video stream at (L−2+a/b)-fold speed.

7. The image signal reproduction apparatus of claim 5 wherein the video display control sets the reproduction speed for the coded video stream at (1200/1001)-fold speed, and the sync signal generation unit outputs a PAL sync signal, thereby converting a frame rate of the coded video stream from a NTSC frame rate to a PAL frame rate.

8. The image signal reproduction apparatus of claim 6 wherein the video display control unit sets the reproduction speed for the coded video stream at (1200/1001)-fold speed, and the sync signal generation unit outputs a PAL sync signal, thereby converting a frame rate of the coded video stream from a NTSC frame rate to a PAL frame rate.

9. An image signal reproduction method for decoding a coded video stream in synchronization with a video sync signal, converting decoded data into a final video signal, and outputting the final video signal in synchronization with the video sync signal, comprising the steps of:

setting the number of skip decoding fields, the decoding of said fields being skipped, on the basis of a multiple reproduction speed for the coded video stream and the number of fields included in one frame image to be decoded;

after decoding the coded video stream corresponding to one frame, skipping the decoding of a coded stream of pictures that are not referred to, while each time a new frame is inputted, counting down the set number of skip decoding fields up to zero;

storing the decoded data into an output buffer;

with start of the decoding of one frame, when decoded data corresponding to said one frame is not referred to at prediction, converting the decoded data corresponding to said one frame into the final video output signal and outputting the final video signal in synchronization with the video sync signal, while when the decoded data corresponding to said one frame is referred to at the prediction, converting decoded data that has been decoded immediately before said decoded data corresponding to said one frame and is referred to at the prediction into the final video output signal and outputting the final video output signal in synchronization with the video sync signal.

10. The image signal reproduction method of claim 9 wherein decoded data corresponding to three frames are stored in the output buffer, and in the step of skipping decoding of the coded video stream, a process of performing the decoding of the coded video stream corresponding to one frame once using the output buffer corresponding to one frame, and decoding a coded stream of pictures that are not displayed but are referred to, using the remaining output buffer corresponding to two frames, thereby successively writing the decoded data over the output buffer corresponding to the two frames, while skipping a coded stream of a picture that is not displayed nor referred to, is executed repeatedly by (K−1) times (K is an integer that meets K≧1), thereby achieving K-fold speed reproduction.

11. An image signal reproduction method for decoding a coded video stream in synchronization with a video sync signal, converting decoded data into a final video signal, and outputting the final video signal in synchronization with the video sync signal, comprising the steps of:

setting the number of display fields that are used for an Image to be displayed, on the basis of a multiple reproduction speed for the coded video stream and the number of fields included in one frame image to be displayed;

changing the number of skip decoding fields, the decoding of the coded video stream corresponding to said fields being skipped according to the set number of display fields, on the basis of the multiple reproduction speed for the coded video stream and the number of fields included in one frame image to be decoded;

after decoding the coded video stream corresponding to one frame, skipping the decoding of the coded video stream of pictures that are not referred to, while each time a new frame is inputted, counting down the changed number of skip decoding fields up to zero;

storing the decoded data into an output buffer; and when decoded data corresponding to said one frame is not referred to at prediction, converting the decoded data corresponding to said one frame into a final video output signal and outputting the final video output signal in synchronization with the video sync signal, while when the decoded data corresponding to said one frame is referred to at the prediction, converting decoded data that has been decoded immediately before said decoded data corresponding to said one frame and is referred to at the prediction into a final video output signal and outputting the final video output signal in synchronization with the video sync signal.

12. The image signal reproduction method of claim 11 wherein decoded data corresponding to three frames are stored in the output buffer, and in the step of skipping decoding of the coded video stream, a process of performing the decoding of the coded video stream corresponding to one frame once using the output buffer corresponding to one frame, and decoding a coded video stream of pictures that are not displayed but are referred to, using the remaining output buffer corresponding to two frames, thereby successively writing the decoded data over the output buffer corresponding to the two frames, while skipping a coded video stream of a pictures that is not displayed nor referred to, is executed repeatedly by (L−2) times (L is an integer that meets L≧2) to achieve (L−1)-fold speed reproduction, or repeatedly by (L−1) times to achieve L-fold speed reproduction, said (L−1)-fold speed reproduction and said L-fold speed reproduction being properly switched, thereby achieving P-fold speed reproduction (L−1<P<L).

13. The image signal reproduction method of claim 12 wherein in the step of changing the number of skip decoding fields, the execution of the (L−1)-fold speed reproduction and the execution of the L-fold speed reproduction are controlled so as to be carried out at a ratio of p:(1−p) (0<p<1), thereby setting the reproduction speed for the coded video stream at (L−p)-fold speed.

14. The image signal reproduction method or claim 12 wherein in the step of changing the number of skip decoding fields, an interval for switching the (L−1)-fold speed reproduction and the L-fold speed reproduction is obtained by a digital differential analyzer method using a combination of integers a and b having a relationship of 1<a/b<2, and the reproduction speed for the coded video stream is set at (L−2+a/b)-fold speed.

15. The image signal reproduction method of claim 13 wherein in the step of changing the number of skip decoding fields, the reproduction speed for the coded video stream is set at (1200/1001)-fold speed, and a PAL sync signal is employed as the video sync signal, thereby converting a frame rate of the coded video stream from a NTSC frame rate to a PAL frame rate.

16. The image signal reproduction method of claim 14 wherein in the step of changing the number of skip decoding fields, the reproduction speed for the coded video stream is set at (1200/1001)-fold speed, and a PAL sync signal is employed as the video sync signal, thereby converting a frame rate of the coded video stream from a NTSC frame rate to a PAL frame rate.

* * * * *